(12) United States Patent
Myles et al.

(10) Patent No.: US 7,058,071 B1
(45) Date of Patent: Jun. 6, 2006

(54) METHOD AND APPARATUS USING PIPELINED EXECUTION DATA SETS FOR PROCESSING TRANSMISSION FRAME SEQUENCES CONFORMING TO A WIRELESS NETWORK MAC PROTOCOL

(75) Inventors: Andrew F. Myles, St. Ives (AU); Alex C. K. Lam, Chatswood (AU); David S. Goodall, Randwick (AU)

(73) Assignee: Cisco Systems Wireless Networking (Australia) Pty Limited, North Sydney (AU)

(*) Notice: Subject to any disclaimer, the term of this patent is extended or adjusted under 35 U.S.C. 154(b) by 962 days.

(21) Appl. No.: 10/090,672

(22) Filed: Mar. 4, 2002

(51) Int. Cl.
*H04L 12/28* (2006.01)
*H04L 12/56* (2006.01)
*H04L 12/66* (2006.01)

(52) U.S. Cl. ...................................... 370/419; 370/463
(58) Field of Classification Search ................ 370/360, 370/381, 389, 395.7, 395.71, 419, 463, 469
See application file for complete search history.

(56) References Cited

U.S. PATENT DOCUMENTS 5,636,140 A * 6/1997 Lee et al. .................... 370/469
6,473,414 B1 * 10/2002 Hartley et al. ............... 370/338

OTHER PUBLICATIONS

Motorola Inc.,Application Note, MPC8xx True Little Endian Mode, 2001. Available from Motorola Inc., Literature Distribution, PO Box 5405, Denver CO 80217. Also online at www.motorola.com/semiconductors.

Motorola Inc., MPC823e Pocket Guide, Revision 1.3. Available from Motorola Inc., Literature Distribution, PO Box 5405, Denver CO 80217. Also online at www.motorola.com/semiconductors.

* cited by examiner

*Primary Examiner*—Chi Pham
*Assistant Examiner*—Kerri Dyke
(74) *Attorney, Agent, or Firm*—Dov Rosenfeld; Inventek

(57) ABSTRACT

A MAC controller for a station in a wireless network, and a method for transmitting packets according to a wireless network MAC protocol. A MAC controller includes a packet scheduler connected to an interface for providing packets for transmission, and transmit hardware connected to a physical layer interface of the station to execute sub-sequences. The transmit hardware includes a buffer to receive from the scheduler and store a set of execution data, and also a signal path to the scheduling engine to provide an indication to the packet scheduler of the outcome of a sub-sequence. The transmit hardware is connected to a receiver to indicate the reception at the wireless station of a data unit that may be a response to a transmission of a sub-sequence.

39 Claims, 9 Drawing Sheets

METHOD AND APPARATUS USING PIPELINED EXECUTION DATA SETS FOR PROCESSING TRANSMISSION FRAME SEQUENCES CONFORMING TO A WIRELESS NETWORK MAC PROTOCOL

BACKGROUND

This invention relates to wireless networks, and in particular, to processing of frame sequences conforming to a wireless medium access control (MAC) protocol.

Wireless networks such as wireless local area networks (WLANs) can be used either to replace wired LANs, or as an extension of the wired LAN infrastructure. IEEE 802.11 is a standard for wireless LANs, and this invention shall be explained with reference to the standard. The invention, however, is also applicable to other wireless networks.

One topology of an 802.11 network is shown in FIG. 1. A Basic Service Set (BSS) includes of two or more wireless nodes, or stations (STAs), which have recognized each other and have established communications. In the most basic form, stations communicate directly with each other on a peer-to-peer level sharing a given cell coverage area. This type of network is often formed on a temporary basis, and is commonly referred to as an ad hoc network, or Independent Basic Service Set (IBSS). In most instances, the BSS contains an Access Point (AP). An access point is a wireless station whose main function is to form a bridge between wireless and wired LANs. The AP also can coordinate communication between the other STAs in the network. The AP is analogous to a base station used in cellular phone networks. An AP can also work as a repeater. When an AP is present, stations do not communicate on a peer-to-peer basis. All communications between stations or between a station and a wired network client go through the AP. AP's are usually not mobile, and form part of the wired network infrastructure. A BSS in this configuration is said to be operating in the infrastructure mode and the network shown in FIG. 1 is such an infrastructure network.

The MAC protocol in the IEEE 802.11 supports two different access methods ("transmission policies"), the mandatory Distributed Coordination Function (DCF) and the optional Point Coordination Function (PCF). PCF provides a polled access mechanism.

Many MAC protocols require a fast response to a received frame. By software implementation of a MAC protocol function is meant the inclusion of a processor in the MAC processing apparatus, and programming instructions (code) for the processor that implement the function. Because of the low latency requirement, a software only MAC implementation requires a fast relatively expensive processor, and possibly complex programming. It is thus desirable to pass on at least some of the MAC functions to hardware, i.e., to include in the MAC processing apparatus some purpose built hardware that performs some of the MAC functions. A complete hardware solution is also possible.

In a combined software/hardware implementation, there is a need to determine how to best divide the functions between hardware and software.

There also is a need to provide MAC processing apparatus that is flexible, i.e., that can accommodate different transmission policies of different MAC protocols, including those not yet invented. The standard DCF and PCF MAC policies may be modified, for example to implement different quality of service (QoS) mechanisms. Such QoS schemes can provide service differentiation between the various priority levels. For example, some real-time applications, such as streaming media that includes real time audiovisual data, may need certain guaranteed QoS. Thus, there is a need for a MAC processor to be easily modifiable to accommodate changes in MAC protocols. A hardware-only MAC is typically very difficult to modify.

Thus, there is a need for a MAC processor that combines hardware elements to implement time critical components, and a processor running software to implement other less-time critical functions. There further is a need to determine what aspects of a protocol to implement in software, and which aspects in hardware.

SUMMARY

A MAC controller for a station in a wireless network, and a method for transmitting packets according to a wireless network MAC protocol are described. In such a station, executing a sub-sequence includes transmitting a data unit and, in the case that as a result, there are one or more expected responses, receiving or not one of the expected responses at the wireless station. Each sub-sequence thus has a finite set of outcomes. A transmission according to a policy of the protocol is decomposable into a set of sequential sub-sequences, and executing each sub-sequence results in an outcome that in turn may lead to further executing of more sub-sequences.

One embodiment of the MAC controller includes a packet scheduler connected to an interface for providing packets for transmission. The scheduler includes a scheduling engine and a memory and receives packets from the higher levels of the protocol.

The MAC controller also includes transmit hardware connected to a physical layer interface of the station. The transmit hardware executes sub-sequences by causing transmission of the data unit of the sub-sequence and detecting which outcome occurs. The transmit hardware further includes a buffer coupled to the packet scheduler to receive from the scheduler and store a set of execution data for the transmit hardware. The transmit hardware has a signal path to the scheduling engine to provide an indication to the packet scheduler of the outcome of executing a sub-sequence.

The transmit hardware is connected to a receiver connected to the physical layer interface to indicate to the transmit hardware the reception at the wireless station of a data unit of one of a set of received data unit types that includes ones that may be a response of a transmission of a sub-sequence.

The packet scheduler initially prepares and loads into the buffer the execution data set for executing the first sub-sequence, and, in response to an indication received from the transmit hardware of a particular outcome of a particular sub-sequence, provides and loads into the buffer the execution data needed for executing one or more sub-sequences that are further along the tree than the particular sub-sequence.

The transmit hardware implements the time critical parts of the protocol, and the packet scheduler schedules information for the transmit hardware. In one embodiment, the packet scheduler is a computer processing system that includes a processor, e.g., a microprocessor, and a memory. The scheduler function can then be carried out in software that runs on the microprocessor.

Each transmission policy of a MAC protocol can be defined by a set of sub-sequences, and each of the sub-sequences in turn can be defined as a list of primitive operations that are performed by the transmit hardware. This provides a MAC processing apparatus that is flexible, i.e., that can accommodate different transmission policies of different MAC protocols, including those not yet invented.

A transmission from any point in time according to a policy is representable by a tree, with each node of the tree representing a sub-sequence and each branch from a particular node of the tree representing one of the outcomes of the sub-sequence of the particular node.

In one embodiment, the buffer is organized to receive from the scheduler and to store several, e.g., two or more sets of execution data. The packet scheduler is arranged to initially prepare and load into the buffer the execution data set for executing all the sub-sequences of a sub-tree starting from the first sub-sequence of the tree. After a number of sub-sequences are executed, the packet scheduler, in response to an indication received from the transmit hardware of a particular outcome of a particular sub-sequence, provides and loads into the buffer the execution data sets needed so that while the hardware is executing the sub-sequence resulting from the particular outcome, the buffer contains the execution data sets of at least each sub-sequence that follows the sub-sequence resulting from the particular outcome.

The time available for the packet scheduler to provide and load the execution data sets in response to the indication is at least the time until the transmit hardware completes executing the sub-sequence following the particular outcome. The sub-sequence being executed and the following sub-sequences that are available to the transmit hardware during the execution form a sub-tree starting with the node sub-sequence being executed.

One embodiment that uses a processing system for the scheduler uses an interrupt for the indication of the particular outcome, and includes a DMA controller connected to the memory to control direct memory access from the memory, and a data FIFO connected to the processor memory to transfer packets of to-be-transmitted data from the processor memory to the transmit hardware under direct memory access.

DETAILED DESCRIPTION

Figure 1:
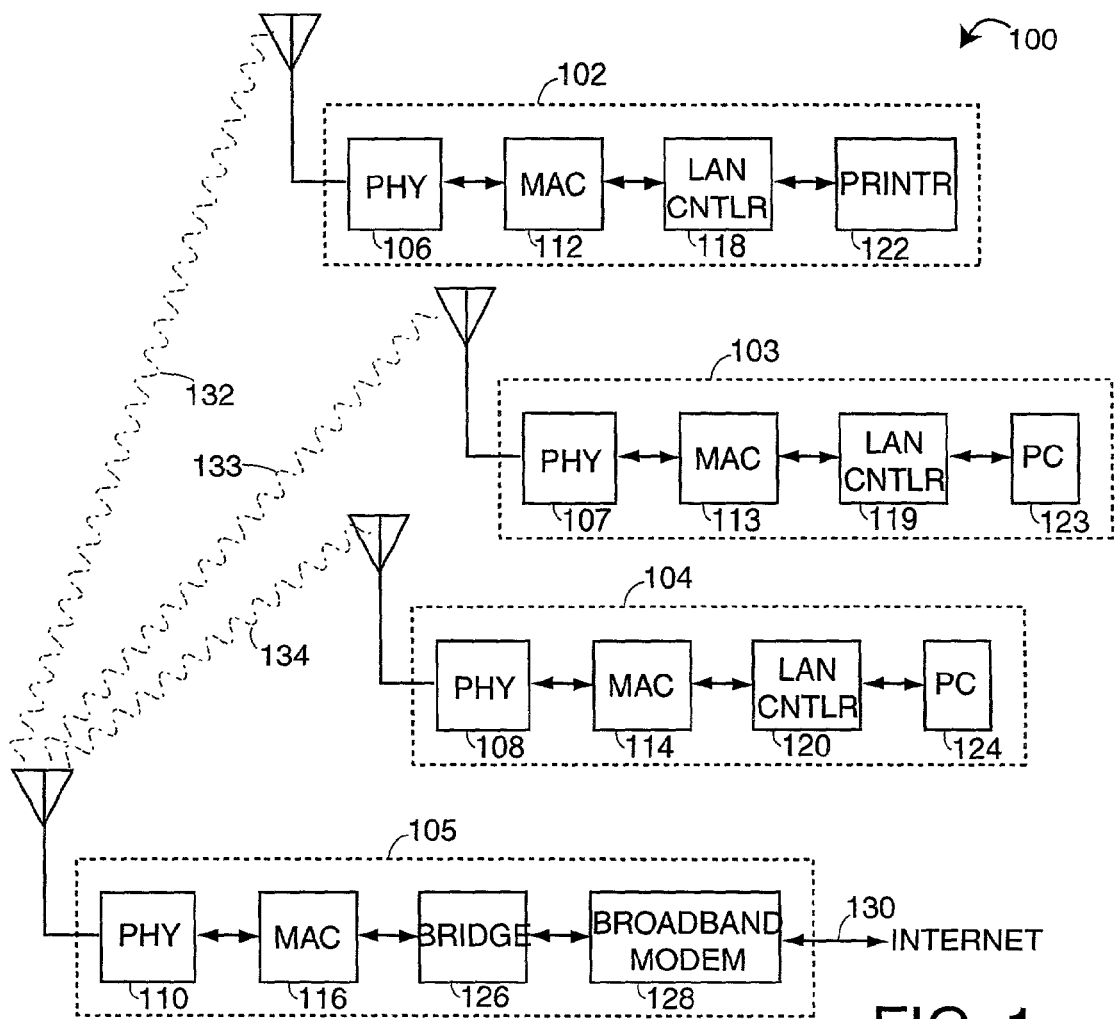
FIG. 1 shows an infrastructure basic service set (BSS) of stations that includes an AP.

The IEEE-802.11 standard defines protocols for wireless data networks, and embodiments of this invention shall be described with reference to that standard. The physical layer (PHY) protocol describes the modulation and demodulation of signals, and the wireless transmission and reception of the signals. The medium access control (MAC) layer protocol specifies the etiquette that each wireless device must observe so the devices on the network all have fair access to the wireless medium, and provides methods for arbitrating requests to use the medium to ensure that throughput is maximized or delay is minimized for all of the users. The standard defines two types of networks, an ad-hoc network, called an independent base service set (IBSS) and an infrastructure network, called a basic service set (BSS). FIG. 1 shows an infrastructure network.

The BSS of FIG. 1 is referred to herein by the general reference numeral 100 and includes one or more wireless stations represented by units 102, 103 and 104, and another station 105 acting as an access point (AP) that may be connected to the Internet or an intranet or any other network. One or more of the wireless stations may be mobile. The access point routes data between the stations and other wireless stations. The AP may also allow mobile stations to roam to another AP and also is used to handle traffic from the mobile radio to the wired or wireless backbone of the network. Network 100 preferably operates according to the IEEE 802.11 standard.

A physical layer interface (PHY) 106, 107, 108, and 110, provides each of the wireless interconnections. A media access control (MAC) controller 112, 113, 114, and 116, provides the next interface layer in a layered communications model. Each of the MAC controllers may include an embodiment of the present invention. A local area network controller 118, 119, and 120 is provided as a peripheral to a computer 123, 124 and, in this example, a printer 122. A bridge 126 interfaces the local area network (LAN) through a broadband modem 128 to the Internet 130. The broadband modem 128 can be implemented with DSL, ISDN, or even two-way satellite connections like Starband (www.starband.com).

A plurality of radio communications, represented by radio links 132, 133, and 134, preferably use the IEEE 802.11a protocol in the 5 GHz unlicensed band that specifies forty-eight active tones and four pilot tones in a 64-tone FFT coded orthogonal frequency division multiplexing (COFDM), and quadrature phase shift keying (QPSK). The modulated signals are transmitted in the 5 GHz frequency band. Other modes can also be used, e.g., 16QAM and 64QAM. Such are described in detail in the IEEE-802.11a standard (www.ieee.com).

While the arrangement of FIG. 1 is prior art, a wireless station (access point and non-access point) that includes an embodiment of the method and apparatus described herein is not prior art.

Figure 2:
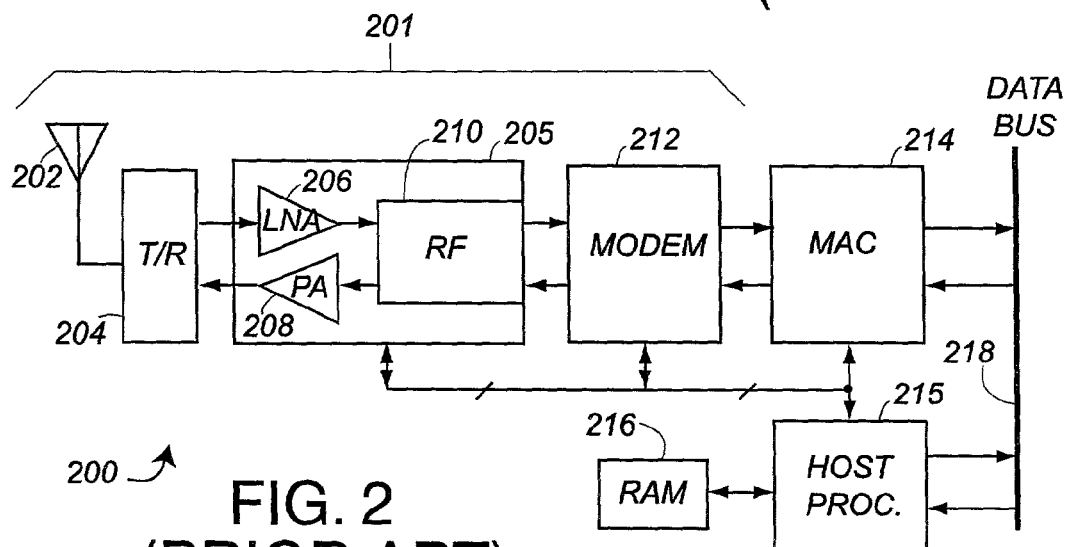
FIG. 2 shows a wireless station in more detail.

FIG. 2 is a functional block diagram of a wireless communication station 200. The station 200 might be, for example, part of a PCMCIA wireless LAN card embodiment, or of an access point device, and includes a physical layer interface (PHY) 201 that in one embodiment includes at least one antenna 202 for 5 G Hz carrier service, a transmit/receive (T/R) switch 204 for half-duplex operation, and a wireless transceiver 205 such as that of FIG. 2 that includes a low-noise amplifier (LNA) 206, a power amplifier (PA) 208, and other radio frequency (RF) 210 transceiver components. The physical layer interface also includes a data modem 212 that deals with modulating and demodulating according to the PHY layer of the standard. The system 200 further includes a media access controller (MAC controller) 214 for layer-2 MAC processing. The MAC controller includes an embodiment of the present invention and operates according to the 802.11 MAC protocol that specifies the access schemes that provide fair access to the medium to the stations and the access point. A computer system databus 218 is accommodated. Interfaces may be included e.g., one or more interfaces that conform to well-known industry standards PCMCIA, PCI, USB, and so forth.

One optional component is a host processor 215. In one embodiment, the host processor is incorporated with the MAC controller 214. A random access memory (RAM) 216 is included for data buffering and program storage. The RAM 216 may be directly coupled to the host or to the MAC controller or to both.

In addition to the radio data between the modem, radio transceiver, and MAC controller, control information such as gain settings for the radio receiver from an automatic gain control module in the modem, and other data, may be communicated between the host (if included), the MAC, the modem and the wireless transceiver.

While a station such as shown in FIG. 2 is prior art, such a station including an access point containing a MAC that incorporates an embodiment of the inventive method or apparatus described herein is not prior art.

Figure 3:
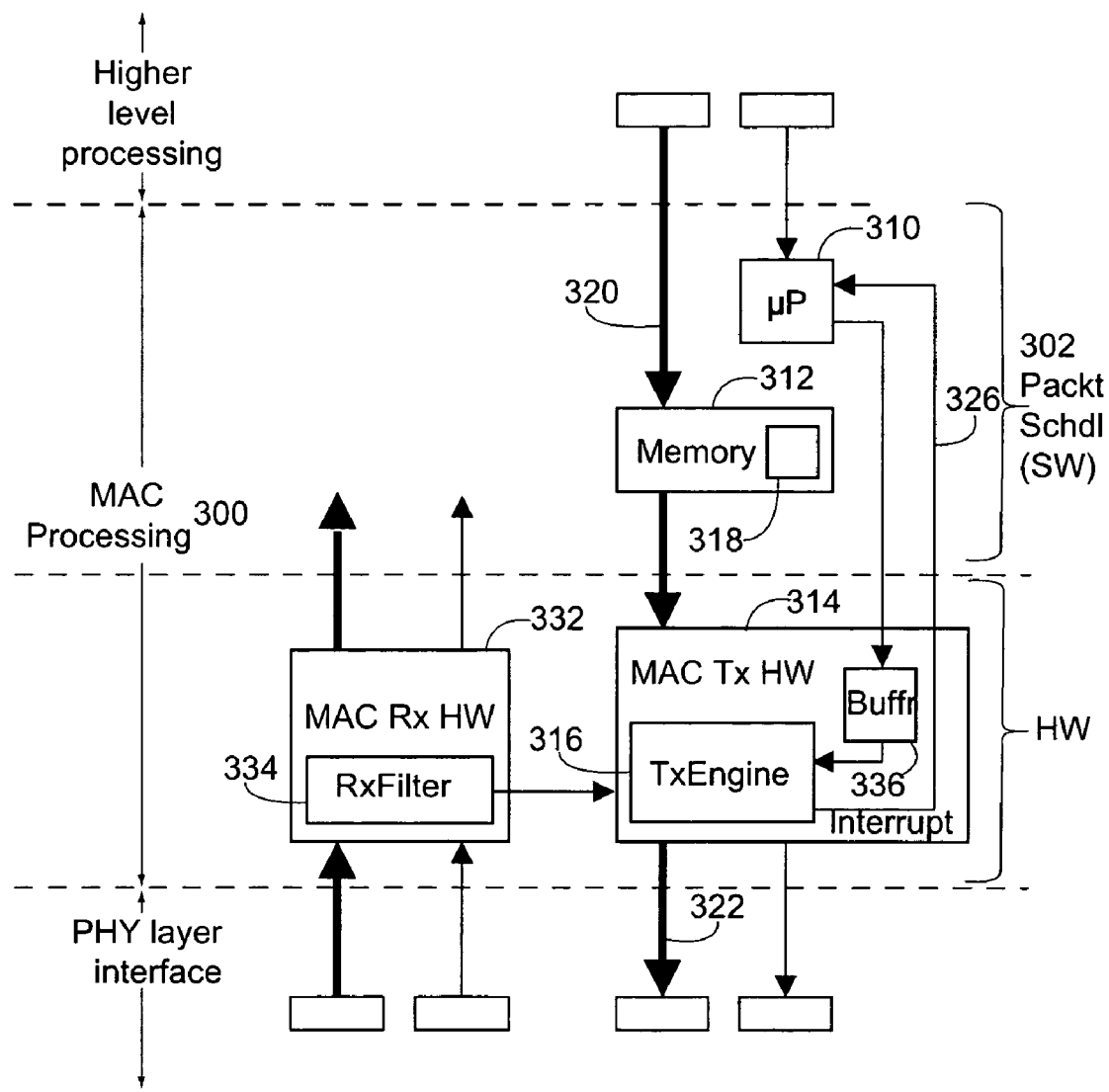
FIG. 3 shows in simplified block diagram form a MAC controller according to an embodiment of the invention.

FIG. 3 shows in simplified form a block diagram of an embodiment of a MAC controller 300 that includes a packet scheduler 302 and MAC transmit hardware 314 containing a transmit engine controller (TxEngine) 316 that controls the transmission of MAC protocol data. The packet scheduler is connected to and receives data 320 from a data link (or higher) level interface of the wireless station. The term "data link level interface" will be used herein to mean an interface for receiving data into and providing data from the layer immediately above the MAC layer, and such an interface may be implicit in the mechanism that processes data according to the layer immediately above the MAC. The MAC transmit hardware 314 sends data 322 to the physical layer for transmitting. In one embodiment, the packet scheduler is a processing system 302 that includes a processor (µP) 310 and a processor memory 312. The MAC transmit hardware 314 is sometimes referred to herein as the "hardware" or simply "HW." Data paths are shown heavier than are the control paths. The processor 310 runs program code 318 shown here as part of processor memory 312. In the preferred embodiment, processor 310 is a microprocessor. Alternate embodiments may use different types of processors, including general-purpose microprocessors, microcontrollers, and digital signal processors (DSPs). The processor in some alternate embodiments may be the host processor 215 of FIG. 2. The program code in alternate embodiments may be in a different memory than memory 312, e.g., the processor may be implemented in a chip that includes on-chip memory for program storage, or may have an architecture with separate data memory and program memory paths. Memory 312 is used here to include all these configurations.

Thus one embodiment includes one or more computer readable code segments (e.g., software) that may be provided on a carrier medium e.g., in the memory or initially on a CD-ROM or otherwise, that cause the processor in processing to implement one or more of the tasks of the packet scheduler.

By "the software performs function X" is meant that the program code 318 includes code to instruct the processing system 302 to carry out function X." Furthermore, the processing system 302 running the MAC-related program code is also referred to herein as the "software" or "SW." In one embodiment of the MAC processor 300, the TxEngine 316 in the transmit hardware 314 transmits frames in the form of MAC protocol data units (MPDUs) in a sequence. By "the transmit hardware 314 transmits" is meant that the HW causes the physical layer interface (PHY) to transmit. Which MPDU of a sequence of MPDUs to transmit at any time is scheduled by the packet scheduler in accordance with the transmission policy of the MAC protocol being used and according to the outcome of the previous transmission of a MPDU. Also shown is MAC receiver hardware 332 coupled to the PHY that processes MPDUs received in the PHY and passed to the MAC layer for MAC processing. The MAC receive hardware 332 includes an RxFilter 334 that generates control signals to indicate to the MAC transmit hardware 314 successful reception of various types of MPDUs for this destination, e.g., that an acknowledgment (an Ack) was received, that a "clear to send" (CTS) was received, that a power save (PS) poll (PsPoll) was received, and so forth. Not shown in FIG. 3 are the various control signals and the receive processing elements other than the generation of the shown control signals.

In one embodiment, the MAC processor 300 provides at least the MAC functions specified in the IEEE 802.11 standard. For completeness, some of these protocols are reviewed.

Basic MAC Functions

The basic MAC functions of the IEEE 802.11 standard are described in detail in the following document: ANSI/IEEE Std 802.11, 1999 Edition (ISO/IEC 8802-11:1999) Local and metropolitan area networks—Specific Requirements—Part 11: Wireless LAN Medium Access Control (MAC) and Physical Layer (PHY) Specifications, referred to herein as the "IEEE MAC/PHY Document." The IEEE MAC/PHY Document is incorporated by reference herein in its entirety. The IEEE MAC/PHY Document and all other IEEE 802.11 standard documents are available on the Internet at several locations, including from the IEEE (www.IEEE.org) and in particular at http://grouper.ieee.org/groups/802/11/index.html.

Distributed Coordination Function

Figure 10A:
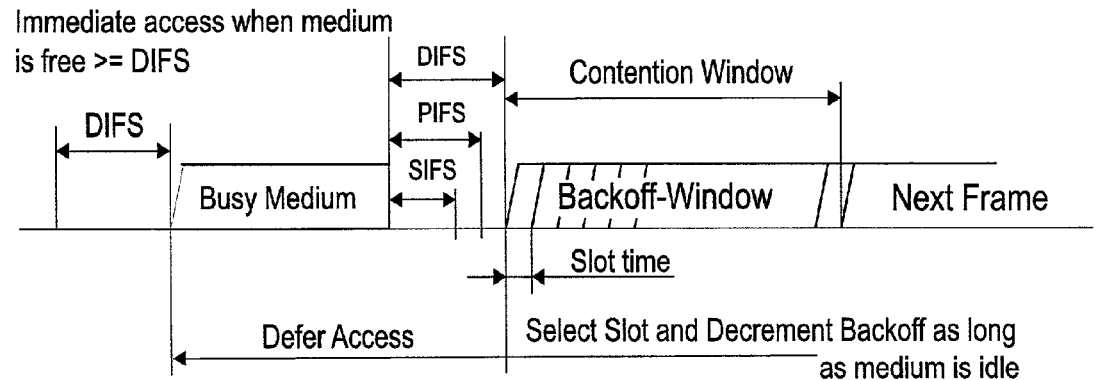
FIG. 10A shows the relationship between various inter-frame spaces in DCF according to the IEEE 802.11 standard.

The Distributed Coordination Function is the basic access mechanism of IEEE 802.11. It uses a Carrier Sense Multiple Access with Collision Avoidance (CSMA/CA) algorithm to mediate the access to the shared wireless medium. An interframe space, IFS, is the time a station waits when the medium is idle before attempting to access it. IEEE 802.11 defines several IFSs, and by using a shorter IFS, the medium is accessed prior to stations using a longer IFS. This is used, for example, to ensure that an acknowledgment frame is sent before any other station can send data. The relations between different IFSs is shown in FIG. 10A.

When the MAC layer of the MAC processor gets some data that should be transmitted, it senses the medium and if the medium is idle, the frame is transmitted. Otherwise, a backoff time denoted B (measured in time slots) is chosen randomly in the interval [0, CW], where CW is the so-called Contention Window. After being busy, when the medium has been detected idle for at least a DIFS, the backoff timer is decremented by one for each time slot the medium remains idle. When the backoff timer reaches zero, the frame is transmitted. If the frame is successfully received at the destination, an acknowledgment frame (e.g., an Ack) is sent to the sender. Upon detection of a collision (which is detected by the absence of an acknowledgment frame), the contention window is doubled (up to a limit). A new backoff time is then chosen and the backoff procedure starts over. Since the contention window is doubled for every collision the probability that the two colliding nodes will choose the same backoff time decreases. The backoff mechanism is also used after a successful transmission before sending the next frame, thus also reducing the probability for collisions. After a successful transmission, the contention window is reset to a minimum value.

Point Coordination Function (PCF)

Figure 10B:
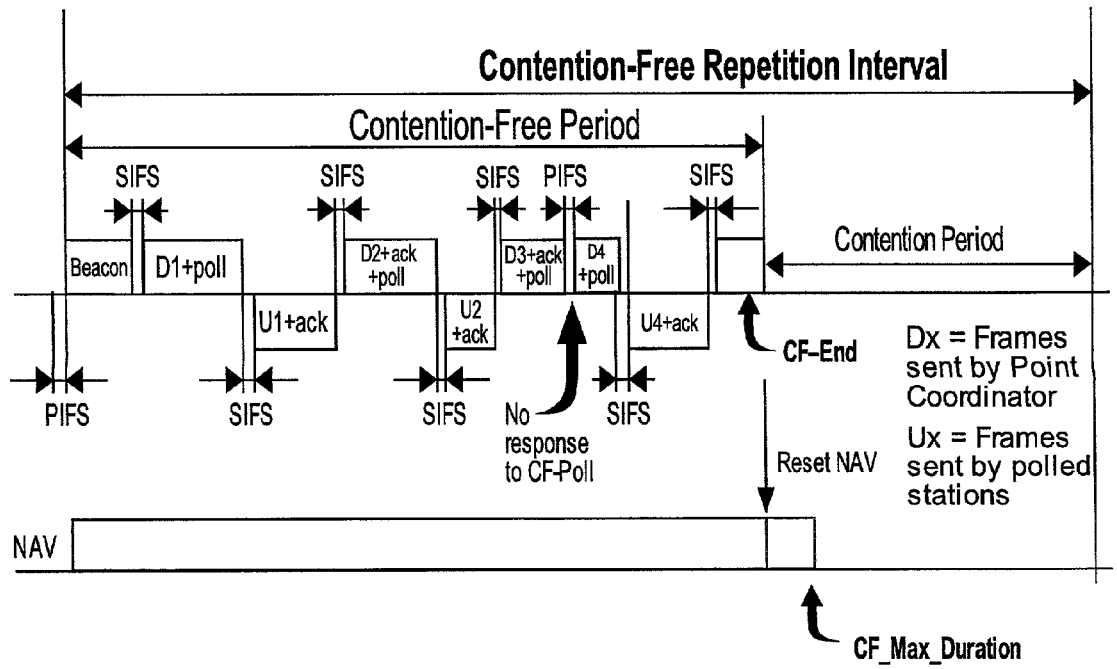
FIG. 10B shows a Contention-Free Repetition Interval in PCF according to the IEEE 802.11 standard.

PCF is a centralized, polling-based access mechanism, which requires the presence of a base station (an AP) that acts as a Point Coordinator (PC). If PCF is supported, both PCF and DCF coexist and, in this case, time is divided into superframes each called a Contention-Free Repetition Interval as shown in FIG. 10B. Each includes a contention period (CP) where DCF is used, and a contention-free period (CFP) where PCF is used. The CFP is started by a special frame called a Beacon sent by the AP.

The point coordinator (PC) keeps a list of stations that have requested to be polled to send data. During the CFP, it sends poll frames to the stations when they are clear to access the medium. Only the PC and polled stations may transmit in a CFP. To prevent starvation of stations that are not allowed to send during the CFP, there must always be room for at least one maximum length frame to be sent during the contention period.

Modifications

The standard DCF and PCF MAC protocols may be modified to implement a quality of service (QoS) mechanism. QoS schemes can provide service differentiation between the various priority levels. For example, some real-time applications, such as streaming media that includes real time audiovisual data, may need certain guaranteed QoS. The access delay is the time from when the data reaches the MAC layer until it is successfully transmitted out on the wireless medium. Many real-time applications have a maximum tolerable delay, after which the data will be useless. Therefore, it is important to provide low delay for real-time flows.

MAC transmission policies other than those disclosed in the IEEE 802.11 standard have been proposed to support station priorities, and such methods may require modifications of the IEEE 802.11 DCF or PCF MAC protocol. Thus it is also desirable to have a flexible MAC controller that can accommodate different transmission policies of different MAC protocols.

General Operation

One embodiment of the invention implements the DCF of the 802.11 MAC protocol. Another embodiment implements the PCF. The PCF embodiment however is not described herein at the same level of detail as the DCF embodiment. From the description, one of ordinary skill in the art would be able to implement not only the DCF but also the PCF and other functions of the 802.11 and other MAC protocols.

The frame sequences allowable by a MAC standard are in general complex and include one or more time critical operations such as transmitting a MAC protocol data unit and waiting for a specified event, and may include one or more operations that are not time-critical, but that might be complex, such as scheduling the frames for transmission. The term "sub-sequence" is used herein to describe a transmission of a MAC protocol data unit (MPDU) followed by an optional response. The result of transmitting the MPDU of a sub-sequence may be success, which includes receiving the response correctly if there is an expected response, or failure. Furthermore, when a response is expected, there may be more than one type possible, each type leading to a different follow-on sub-sequence.

A transmission of a sequence of frames according to a policy is decomposable into a set of sequential sub-sequences. The next sub-sequence to execute, if any, depends on the outcome, e.g., success or failure of executing the current sub-sequence, and on the policy.

In one embodiment, a sub-sequence is decomposed into a list of primitives that describe the necessary actions that the hardware 314 needs to take for transmitting the MPDU and receiving the response of the sub-sequence. Each of the primitives describes a simple action in the transmission engine. One of the primitives, for example, is an instruction to obtain data from the memory 312 of the processing system 302 and make such data available to the HW. Another is causing the PHY to transmit a MPDU, and yet another is waiting for a response from the receiver part of the station of access point.

Table 1 below lists the sub-sequences and the possible responses that are used to implement the DCF.

TABLE 1

| MPDU transmitted | by | Possible MPDU responses | |
|---|---|---|---|
| RTS | AP or STA | CTS | |
| Frag(dir) | AP or STA | Ack | |
| Frag(board) | AP | (none expected) | |
| PsPoll | STA | Ack | Frag(dir) |

In Table 1, RTS denotes a Request to Send MPDU, Ack denotes a type of acknowledgment MPDU in response to a sub-sequence transmitting, Frag(.) denotes transmission of a data fragment. Frag(broad) is a broadcast of a fragment, which is always successful, and PsPoll is a power save poll MPDU. Each of these types of MPDUs is described in more detail below and in detail in chapter 9 of the IEEE MAC/PHY Document, incorporated herein by reference. Note that an Ack means that an "Ack" acknowledgment signal is received by the receiver part of the MAC. CTS (clear to send) is another type of acknowledgment.

One embodiment of a set of primitives for processing these DCF sub-sequences is described further below.

Thus a sub-sequence may include one or more expected responses. If only one kind of response is expected, i.e., the follow-on sub-sequence depends on whether such a response is received or not, one can define two outcomes of a sub-sequence, called "success" and "failure" herein that respectively represent success in receiving an expected response, and failure to receive such response when expected. For example, an RTS sub-sequence can result in success when an CTS is received, or failure if no expected CTS is received. Those sub-sequences where no response is expected typically only have one outcome, and this may be assigned to "success." Thus, a Frag(broad) only has one outcome, assigned in one embodiment to "success."

Table 2 below lists the sub-sequences and the possible responses therein that in one embodiment are used to implement the PCF of the IEEE 802.11 standard.

TABLE 2

| MPDU transmitted | by | Possible MPDU responses | | | |
|---|---|---|---|---|---|
| CfPoll {+CfAck} | AP | Data(dir), more data | Data(dir), no more data | Null | Ack |
| CfPoll + Data(dir) {+CfAck} | AP | Data(dir) + CfAck, more data | Data(dir) + CfAck, no more data | CfAck | Ack |
| Data(dir) {+CfAck} | AP | | | | Ack |
| Mgt(dir) | AP | | | | Ack |
| Data(broad) | AP | | | | |
| Mgt(broad) | AP | | | | |
| Data(dir) {+CfAck} | STA | CfAck | CfPoll + CfAck | CfPoll + Data(dir) + CfAck | Data(dir) + CfAck | CfEnd + CfAck |

CfPoll denotes a contention-free poll MPDU, CfAck denotes a contention-free acknowledgment MPDU, Data (dir) is a data MPDU, Mgt(dir) denotes a management MPDU, and broad denotes a broadcast of the MPDU, in which case no response is expected in the sub-sequence. Brackets {+CfAck} indicate optional piggybacking, e.g., piggybacking a CfAck in the MPDU.

A set of primitives that each of these sub-sequences can be decomposed into is described further below.

More than two outcomes may be defined for some of the sub-sequences. For example, two or more types of successes may be defined depending on what sort of response is received and on whether or not that success leads to a different next sub-sequence to process. In one embodiment, the CfPoll{+CfAck} and the CfPoll+Data(dir){+CfAck} sub-sequences that are executed by an AP are assigned a fail outcome and two different type of success outcomes, called "success-more" and "success-nomore," respectively, to indicate that the successfully responding STA respectively has and does not have more data, e.g., more contention-free period (CFP) data.

Referring to FIG. 3, the different MAC protocol policies are implemented by preparing data in the packet scheduler, e.g., in the processing system 302, determining the next sub-sequence including in some cases determining the MPDU, or modifying a data packet, and passing to the MAC transmit HW 314 all the data needed to execute that next sub-sequence, including how to transmit that MPDU, further including in one embodiment a pointer to a packet in the memory and including what responses to expect, if any. The data needed by the HW to execute the next sub-sequence is called the set of execution data of that sub-sequence.

Once the sub-sequence outcome occurs, e.g., the transmission by HW 314 succeeds or not, e.g., by the appropriate response signal received or not received from RxFilter 334 in the required time, the transmit HW 314 produces an indication to the processing system 302, e.g., via an interrupt signal 326 to the processor 310, indicating the sub-sequence outcome, e.g., whether the just completed sub-sequence ended in success or failure. In one embodiment, the interrupt has associated with it one or more registers indicating the outcome of the just completed sub-sequence. After issuing the interrupt, the transmit hardware 314 waits to execute the next sub-sequence in the sequence as specified by the transmission policy. To so execute, the MAC transmit HW 314 needs from the processing system 302 the execution data set of the appropriate next sub-sequence. This needs to be available quickly. For example, using the IEEE 802.11a standard at 54 Mb/s, the transmit hardware 314 needs this information within only approximately 2 μs from the time of the interrupt in the worse case scenario of a very short PCF or DCF broadcast or a typical case PCF or DCF 64 byte uni-cast transmission. Thus, if the processing system 302 is to provide the execution data set for the next sub-sequence in response to the interrupt, the processing system needs to respond relatively very rapidly to that interrupt.

Figure 4A:
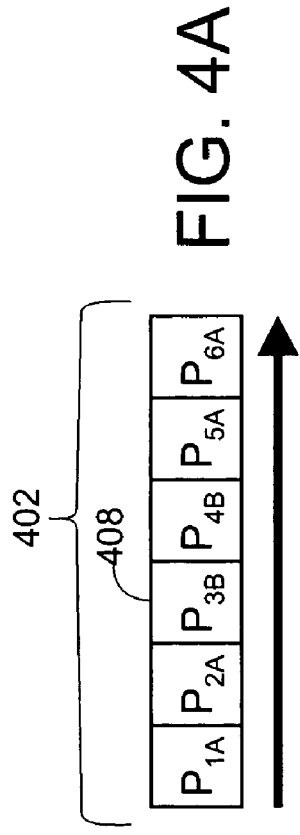
FIG. 4A shows an ordered queue of packets to transmit.
Figure 4C:
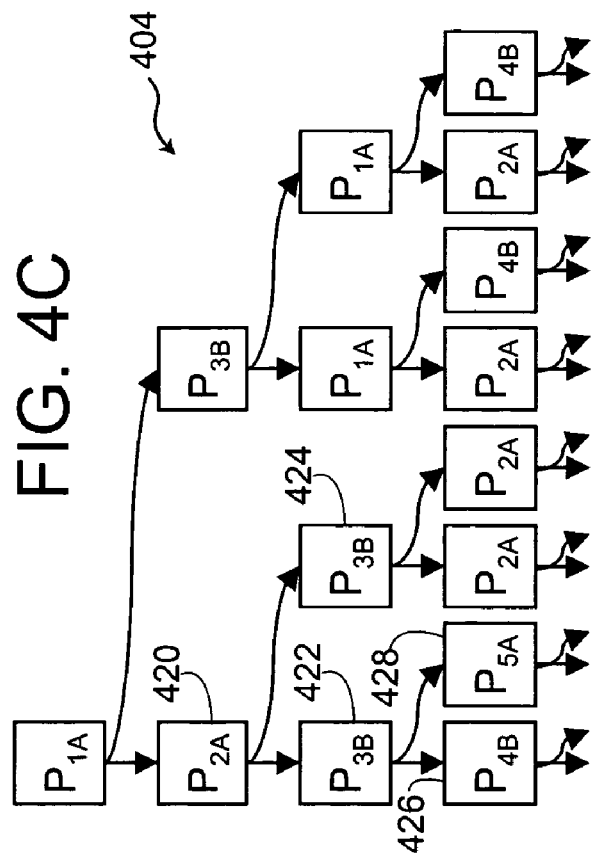
FIGS. 4B and 4C show the scheduling trees for transmitting the packets of FIG. 4A according to two different policies.
Figure 4B:
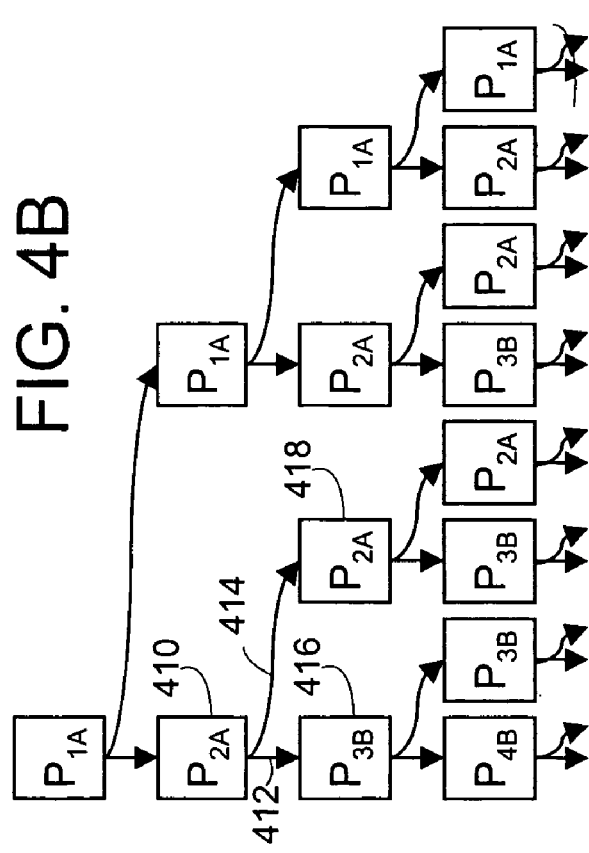

Starting from any point of time, given an ordered list of frames for transmission, the possible ordering of sub-sequences, i.e., PDU transmissions and possible responses according to a transmission policy, may be described by a tree. Each node of the tree represents a sub-sequence at a point in time. Thus, a policy based scheduling tree may be constructed at any point in time for future transmissions. There may be one or more branches from the node indicating different outcomes of the sub-sequence, i.e., the tree may be m-ary. In the case that a sub-sequence has two possible outcomes respectively called success and failure, a path through the tree depends on whether each sub-sequence succeeds or fails. The next sub-sequence to execute, i.e., the next node of the tree depends on whether the current sub-sequence leads to success or failure. Much of the description herein is for this case of binary trees. How to extend to m-ary trees, i.e., more than two outcomes to the sub-sequences, is straightforward. FIGS. 4A, 4B, and 4C illustrate two trees, one for each of two policies, for transmitting the same sequence of frames. Each node of the trees is shown having a left branch and a right branch. A branch to the left indicates a success, e.g., as indicated by an acknowledgment (Ack) received by the receiver as expected in response to the transmission, and a branch to the right indicates a failure, e.g., no response received within some time window. FIG. 4A shows an ordered queue 402 of packets to transmit. Each transmission of a packet is part of a sub-sequence. How to order the sub-sequences in time is determined by some scheduling policy. $P_{ab}$ indicates a frame for transmission, the first subscript of P, denoted by a, indicates the frame or sub-sequence number, and b, the second subscript of P, indicates the destination, so that $P_{3B}$ (shown as 408 in FIG. 4A) is the packet numbered 3 with destination B.

FIG. 4B shows the tree of the first four levels of the tree that would result from a simple retransmission policy of re-transmitting a packet until it successfully transmits and until all the packets of queue 402 are transmitted. As an example, consider the transmission of packet $P_{2A}$. The node $P_{2A}$ in the tree, shown as node 410, includes the transmission of packet 2A and any expected response. Suppose, for example, that in response, an Ack is expected within an allowed time to indicate successful reception by the recipient. If such an Ack is received within the allowed time, the sub-sequence succeeds and branch 412 indicates that the next sub-sequence is node 416, which includes transmitting packet $P_{3B}$ and any response. If on the other hand no Ack is received within the allowed time in node 410, the right branch, i.e., branch 414 indicated the next sub-sequence to execute. Under this policy, the next sub-sequence shown as node 418 includes a retransmission of the packet of the unsuccessfully processed sub-sequence, i.e., retransmission of packet $P_{2A}$.

FIG. 4C shows the tree 404 of the first four levels of the tree that would result from a different policy of avoiding head of line blocking. According to such a policy, after a failure to transmit to a recipient, the next sub-sequence includes transmitting to a different recipient. As a first example, consider the transmission of packet $P_{2A}$ in the sub-sequence $P_{2A}$ shown as node 420. If the transmission is successful, the next node, indicated as 422 is a sub-sequence that transmits $P_{3B}$, the next packet in the queue 402. If the transmission fails, the next node, indicated as 424, is a sequence involving a transmission of a frame not to the same recipient, i.e., not to A, and in this case this is again packet $P_{3B}$, the next packet in queue 402. Consider as a second example the successor nodes to node 422 (transmitting $P_{3B}$). If the sub-sequence succeeds, the next node 426 is a sub-sequence transmitting $P_{4B}$, the packet in queue 402. If the transmission fails, however, the fail branch leads to node 428 that transmits not the next packet in queue 402—a packet that is to the same destination B—but packet $P_{5A}$, the first packet following $P_{3B}$ that is not to destination B.

Referring again to FIG. 3, according to one embodiment of the software/hardware MAC controller of FIG. 3, each node of a tree for a frame sequence and policy indicates the execution by the HW 314 of a sub-sequence that is prepared and passed to the transmit hardware by the processing system 302 in the form of an execution data set.

One aspect of the invention is to pre-load into the transmit hardware 314 the execution data sets needed for one or more of the possible future sub-sequences in order to improve the interrupt latency, i.e., to provide the processing system 302 with more time to react to the completion of a sub-sequence. That is, one aspect of the invention is to make available to the hardware more than the next level of the tree.

Different embodiments may include making available in the hardware different amounts of the scheduling tree. That is, while the HW is executing any node, the HW has available the execution data sets for the other nodes of a sub-tree of the tree. The sub-tree size determines how far into the future execution data sets are available to the hardware. In the extreme, the processing system 302 can pre-load into the hardware the whole scheduling tree. This requires pre-determining many execution data sets by the processing system 302, many of which will never be used by the hardware. Thus an implementation preferably operates on only a sub-set of the tree, i.e., a sub-tree—to avoid construction and storage of the full tree. The more future nodes of the tree the processing system 302 passes to the transmit hardware 314, the more time is available to react to a particular outcome, but also the more outcomes need to be prepared by the processing system 302. Some of the outcomes of any level prepared ahead of time will be later thrown away. Thus a balance is sought between the amount of extra time provided for the processing system 302 to prepare next sub-sequence execution data set, and both the "wasted" effort to determine the future execution sets that will be discarded, and the amount of memory required to store the future execution data sets.

Using the example of FIG. 4C, FIGS. 5A–5D show different embodiments in which the execution data sets of different sized sub-trees are preloaded into the hardware. The initially loaded sub-trees are shown as solid rectangles, while the other nodes of tree are shown in a rectangle of broken lines.

Figure 5A:
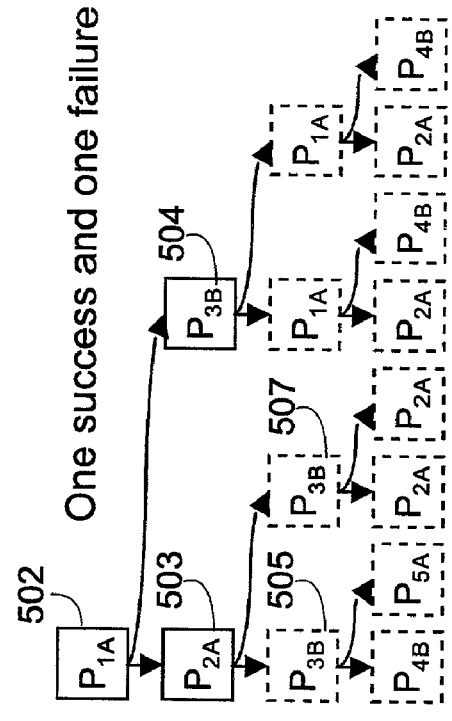
FIG. 5A illustrates the scheduling tree of FIG. 4C for an embodiment of the invention where there is only pre-loading of the known next sub-sequence in the tree, i.e., no pre-loading of the data execution sets for future nodes of the tree.

FIG. 5A illustrates an embodiment where there is only pre-loading of the known next sub-sequence in the tree, i.e., no pre-loading of the data execution sets for future nodes of the tree. Initially, the first sub-sequence, shown in a solid line, i.e., for the packet $P_{1A}$ is loaded for execution. When the sub-sequence is completed, the transmit hardware 314 issues an interrupt to the processing system 302, and the processor now generates and loads into the transmit hardware 314 the next sub-sequence's execution data, depending on the outcome (success or failure). This continues as the MAC processor executes all the sub-sequences of the tree. In this example, the processor needs to generate and load the next sub-sequence's execution data as soon as the interrupt occurs and in time for the transmit hardware 314 to be able to transmit, so the processor needs to respond to the interrupt relatively fast.

Figure 5B:
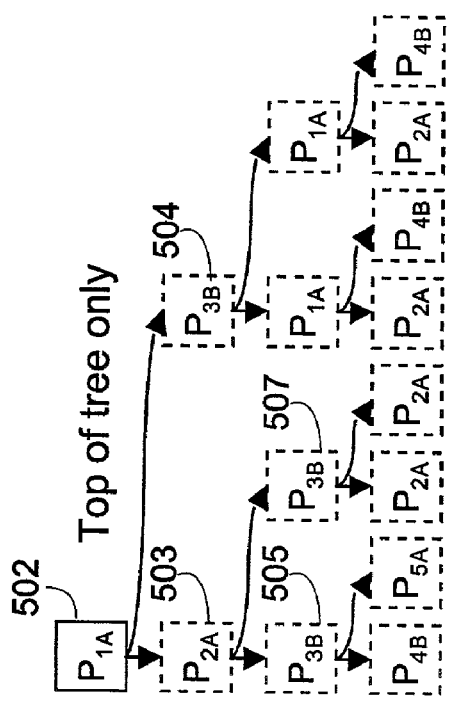
FIGS. 5B, 5C, and 5D each illustrate the scheduling tree of FIG. 4C for three different embodiments of the invention where there is pre-loading of a sub-tree of the tree of FIG. 4C.

FIG. 5B shows the case of the transmit hardware 314 having available not only the next sub-sequence's execution data set, but also of the next level of the tree. That is, to allow for more time for the processing system 302 to react, in one embodiment, the processing system 302 prepares and makes available to the hardware ahead of the time the presently executing sub-sequence reaches its outcome not only the execution data set of the current sub-sequence, but also the execution data sets of each of the next sub-sequences for each of the outcomes of the current sub-sequence, e.g., how to execute the next sub-sequence if there was success, and how to execute the next sub-sequence if there was failure. When a sub-sequence ends in one of the outcomes, e.g., a success or a failure, the hardware now has the information required to execute the next sub-sequence whatever the outcome, and thus does not need to wait for the processing system 302 to prepare this next sub-sequence execution data set.

Referring to FIG. 5B, initially the processing system 302 prepares the execution data of the next sub-sequence, shown as 502, the execution data set of the subsequent sub-sequence for each of the outcomes of the next sub-sequence, i.e., the data sets for transmitting $P_{1A}$, $P_{2A}$, and $P_{3B}$ shown in solid boxes as 503 and 504, respectively. The SW passes these sets of execution data to the HW. That is, the software initially prepares and passes to the hardware the execution data sets of the present level and of the next level of the tree of the policy. Whenever the software now receives an indication of an outcome from the hardware, the software passes the execution data set or sets of the next level of the tree. For example, if the first sub-sequence was successfully executed, the processing system 302 prepares and passes to the HW the data sets for the sub-sequences that follow the outcomes of node 503, i.e., of nodes 505 and 507. Thus a pipeline of execution data containing two levels of the tree is formed from the processing system to the transmit hardware. The software then has at least the shortest time period required by the transmit hardware to execute a sub-sequence to respond to any outcome indication from the hardware. The cost is that the processing system 302 needs to calculate the data set for one success node that will be thrown away when a failure occurs, and one failure node that will be thrown away when a success occurs.

In one embodiment, the execution data set is in the form of a register set that is understood by the TxEngine 316. There is one register set for the information required to execute the present sub-sequence, and one register set for the information required for executing each subsequent success sub-sequence and for the subsequent failure sub-sequence. In one embodiment, this information includes a pointer to any data from memory that is needed in the MPDU of the sub-sequence. The register sets are passed between the processing system 302 and the TxEngine 316 of the transmit hardware 314 using a buffer forming a pipeline, in one embodiment arranged as a register set queue for successes and a register set queue for failures. The pipeline buffer is shown as 336 in FIG. 3.

Figure 6:
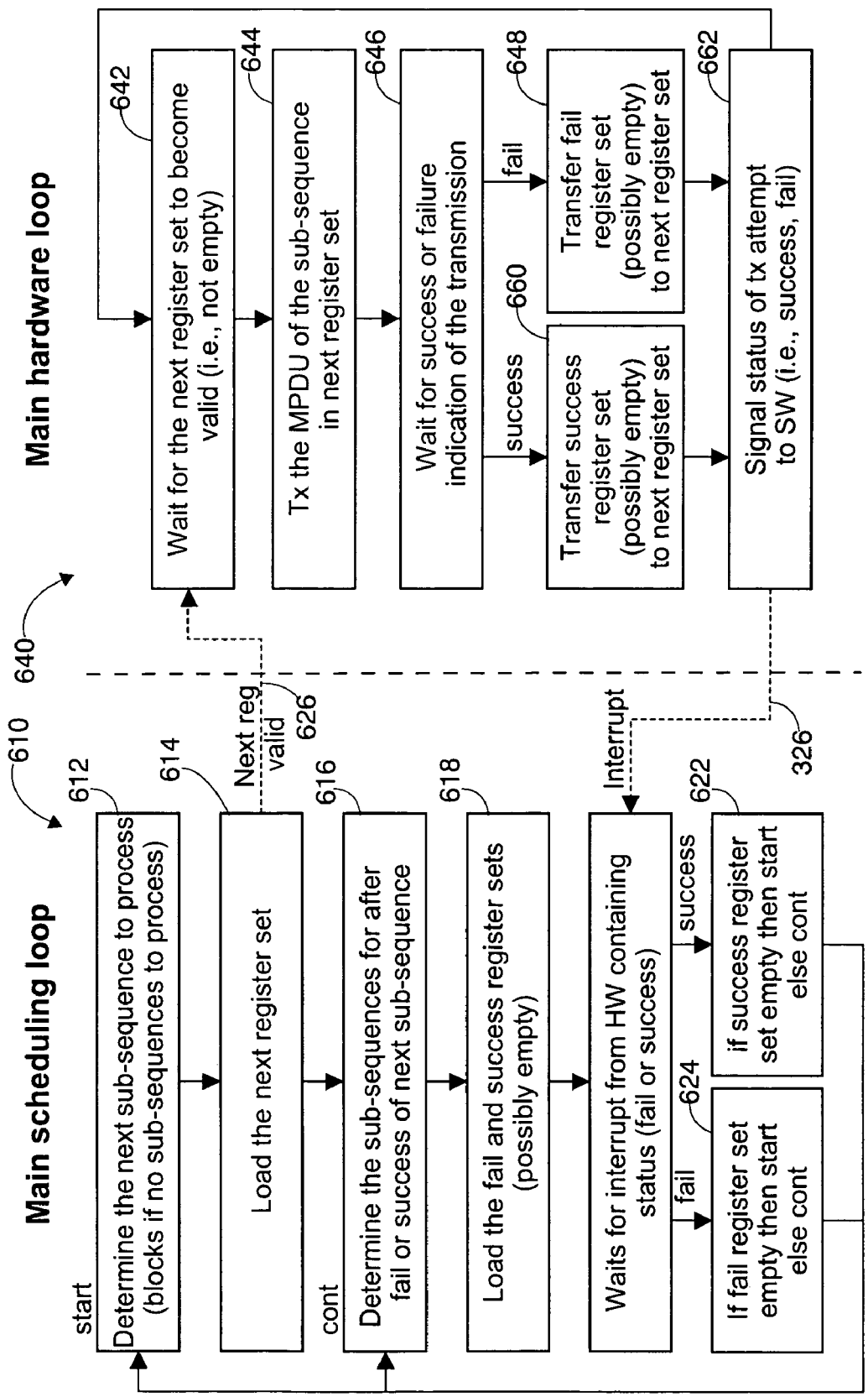
FIG. 6 shows in simplified form a flowchart of the operation of one embodiment of the invention.

FIG. 6 shows a flowchart for the operation of MAC processor 300 that includes the processing software in the processing system 302 (flow chart 610) and the operation of the MAC transmit hardware 314 (flow chart 640). Considering first the loop 610 implemented by the processing system 302 (the scheduler), in step 612 the scheduler determines the register set of the next sub-sequence to execute. If there is no sub-sequence to execute, this step waits until there is a sub-sequence. In step 614 the scheduler programs the next register set for this next sub-sequence and passes it to the success queue of the register set pipeline 336. Included in the register set is a valid flag that indicates that the next register is available. In step 616, the SW determines the sub-sequences to execute both after the fail (or failures) and also the success (or successes) of the sub-sequence just determined in step 612. In step 618, the corresponding register sets for the successors to the fail and success outcomes are loaded into the fail and success queues, respectively, of the buffer. Some of these register sets may be empty. The scheduler, i.e., the processing system 302 now waits for an interrupt 326 from the transmit hardware 314 containing the status, e.g., fail or success. Once an interrupt is issued as a result of the transmit hardware 314 knowing whether the transmission of a sub-sequence led to a failure or success, the scheduler continues. In the case of a failure (step 624), and the fail register set is empty, then the scheduler loops back to start, i.e., step 612 to determine the next sub-sequence and register set therefor. If the fail register set is not empty, i.e., the next sub-sequence and register set therefor are already known, then the scheduler loops back to "cont," i.e., step 616 to determine the sub-sequences to execute after both failure and success of the next sub-sequence. Similarly, in the case of a success (step 622), and the success register set is empty, then the scheduler loops back to start, i.e., step 612 to determine the next sub-sequence, or, if the success register set is not empty, then the scheduler loops back to "cont," i.e., to step 616 to determine the sub-sequences to execute after both failure and success of the next sub-sequence.

Flowchart 640 shows the steps undertaken by the MAC transmit hardware 314. The HW waits for the next register set to become available (step 642), as indicated by the valid flag 626 from the scheduler being set. Once the register set is available, the HW forms the MPDU, including obtaining any data that was in memory and that is required in the MPDU, and transmits the MPDU of the sub-sequence of the register set (step 644). Some time later, if a response is expected, the receiver indicates to the MAC transmit HW 314 whether or not the transmission succeeded. Thus, in block 646, the transmit HW 314 waits for an indication from the receiver of success or not. Step 644 and, when necessary, step 646 thus describe execution of the sub-sequence. If the subsequence has a successful outcome, then in step 660 the register set for the success—i.e., for example, from the success queue—is transferred to become the next register set, and the next register set from the failure queue is discarded. The success register set may be empty. In addition, an interrupt signal is issued (step 662) to inform the scheduler of the success or failure of the sub-sequence. The flow now loops back to step 642 of waiting for this register set to become available. Similarly, if the subsequence failed, then in step 648 the register set for the failure is transferred to become the next register set and the next success register set is discarded. The fail register set also may be empty. In addition, an interrupt signal is issued (step 662) to inform the scheduler of the success or failure of the transmission. The flow now loops back to step 642 of waiting for this register set to become available. Note that the designer needs to be careful to avoid race conditions.

With the register sets for two levels of the tree prepared and passed to the transmit hardware 314, it was found by the inventors that the time available for the scheduler to respond to interrupts from the transmit hardware 314 increases from about 2 μs to: more than 40 μs in a worse case PCF (very short broadcast at 54 Mb/s); about 76 μs for a typical case PCF (64 byte uni-cast at 54 Mb/s); at least 58 μs in a worse case DCF (very short broadcast at 54 Mb/s); and between 94 μs and 9 ms for a typical case DCF (64 byte uni-cast at 54 Mb/s). This, for example, can make the difference between using an inexpensive processor in the processing system 302, and needing a much more expensive processor.

Figure 7:
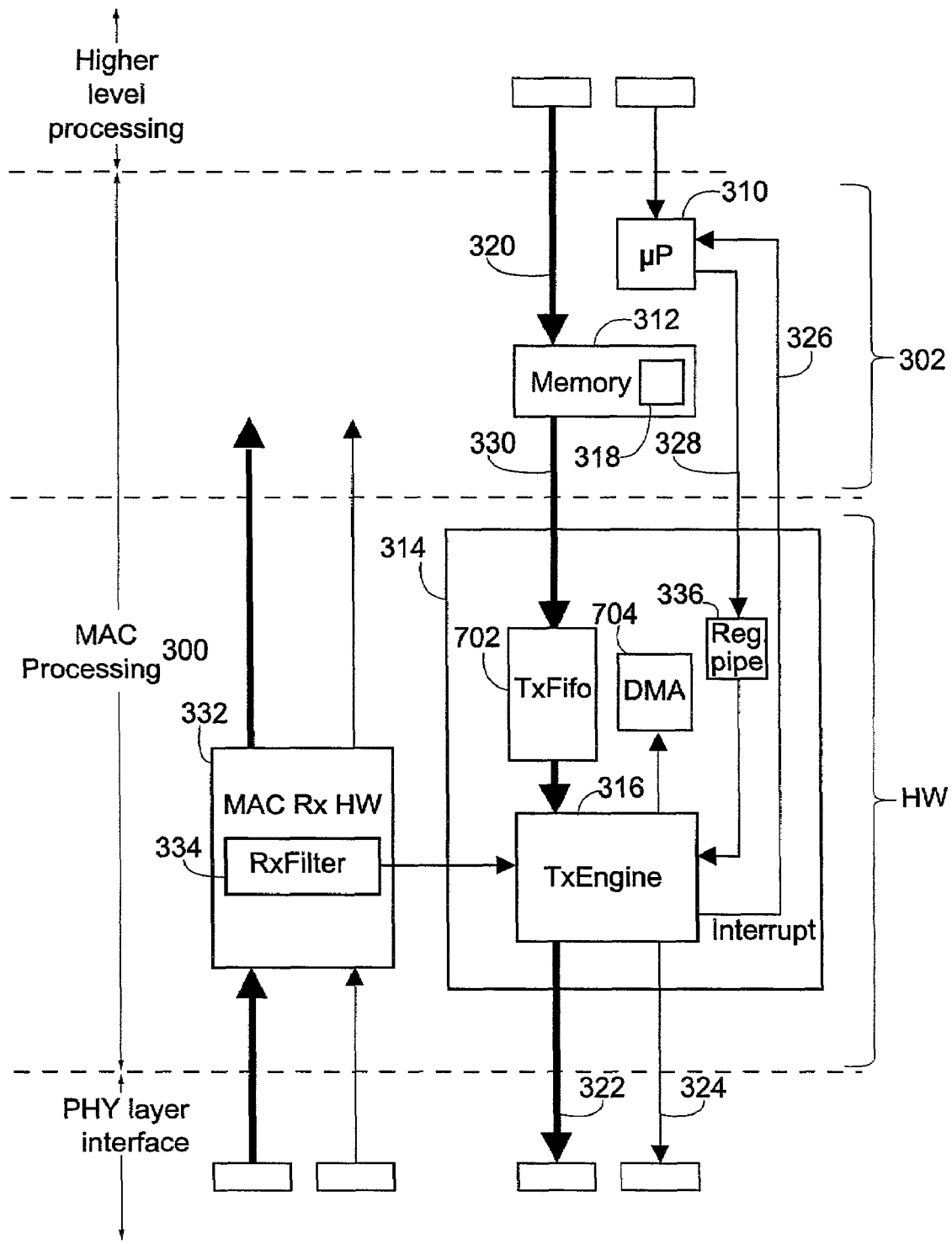
FIG. 7 shows in simplified block diagram form a MAC controller according to an embodiment of the invention that includes DMA transfer.

FIG. 7 shows one embodiment of the transmit hardware 314 that includes a DMA controller 704 and a data FIFO buffer 702 ("TxFifo"). The DMA is controlled by the transmit engine controller (TxEngine) 316. During normal operation, the processing system 302 sets up the success and fail register sets and places them in the register pipeline 336. The TxEngine 316 sets up the DMA controller 704 to transfer the appropriate MPDUs from memory into the data FIFO depending on the status of previous transmissions such that only MPDUs that are actually transmitted are transferred to the TxFifo 702.

In one embodiment, a data structure in the form of a linked list is set up in the data FIFO so that the register sets need not include explicit pointers. In such a case, the first register set includes the link to the first entry.

Figure 8:
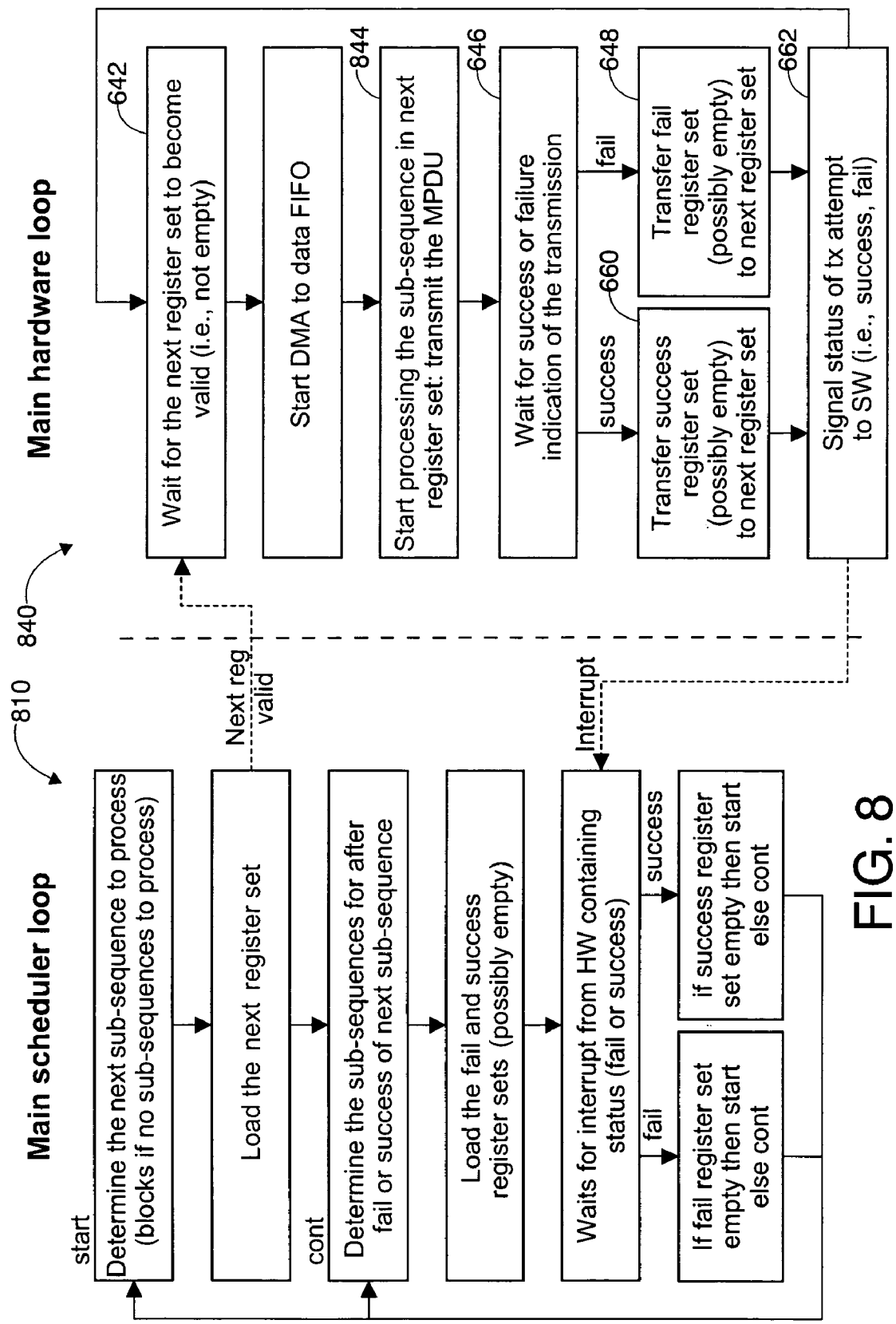
FIG. 8 shows in simplified form a flowchart of the operation of an embodiment of the invention that includes DMA transfer.

FIG. 8 shows a flow chart for operating the MAC processor of FIG. 7, and includes a DMA scheduler loop 810 and a DMA hardware loop 840. The DMA scheduler loop is similar to the scheduler loop 610 of FIG. 6 but the data when needed by the transmit hardware will be in the data FIFO. The DMA hardware loop 840 only differs from the hardware loop 640 of FIG. 6 in that once the next register set becomes available (block 642), the hardware sets up and starts the DMA transfer of the required data into the data FIFO 704 and in step 844, transmits the appropriate MPDU. In the flowchart of FIG. 6, the transmitting step 644 included obtaining any data that was in memory and that was required for the MPDU being transmitted. In the analogous step 844, the data is available in the data FIFO (TxFifo).

In alternate embodiments, the execution data sets for executing a sub-tree having more than two levels of the tree are initially passed to the HW 314 to form a pipeline of more than two levels of the tree so that while the hardware is executing any sub-sequence, the nodes of the tree that follow that sub-sequence are available to the hardware. In one embodiment, a three-level sub-tree is initially made available to the hardware, i.e., execution data sets for the following nodes are made available:

the next node.

the subsequent success node followed by the subsequent success node.

the subsequent success node followed by the subsequent failure node.

the subsequent failure node followed by the subsequent success node.

the subsequent failure node followed by the subsequent failure node.

This provides the scheduler, e.g., the SW, even more time to react to an interrupt from the HW. After the initial loading, whenever an interrupt occurs providing an indication to the processing system 302 of the outcome, the execution data sets for the next level of the tree are prepared and loaded into the pipeline 336, and the execution data sets that follow the outcome that did not occur are discarded.

The more levels that are initially loaded into the pipeline, the more time the processor has to deal with an interrupt. The cost, however, is that the processing system 302 has to calculate the data sets of more outcomes, and whenever an outcome occurs, half of the pre-calculated tree is discarded.

In one embodiment, the execution data sets of a pruned sub-tree are pre-calculated, the pruned sub-tree including the most likely path. Thus, when the transmit hardware 314 reaches an outcome that was not pre-calculated, there is a performance penalty because the processing system 302 now needs to prepare more of the tree.

Figure 5C:
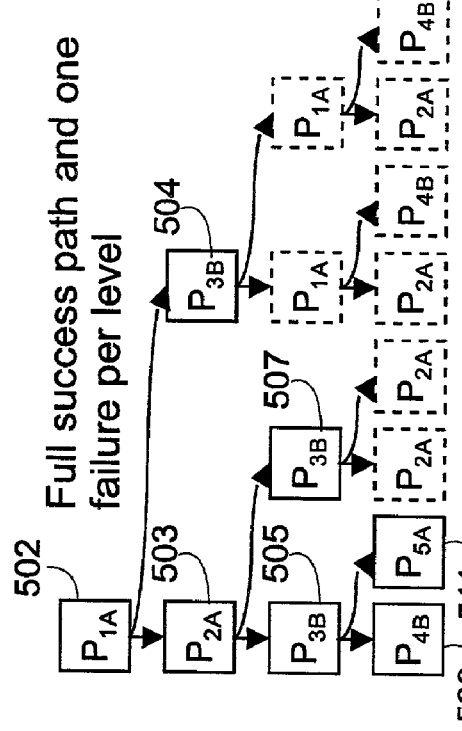
Figure 5D:
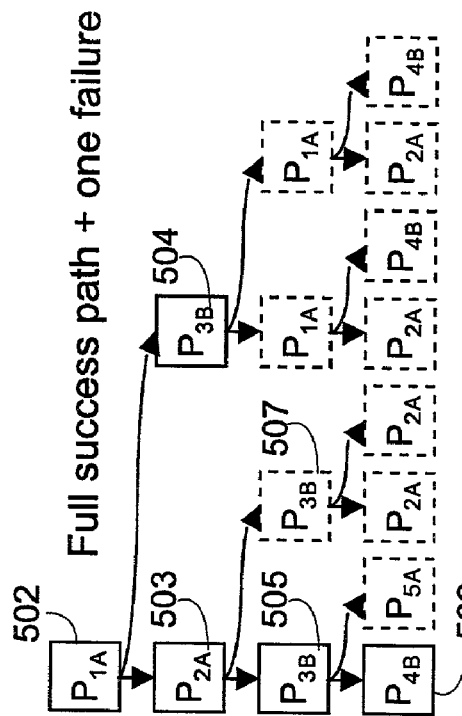

One pruned sub-tree embodiment includes passing to the HW the execution data sets of a tree that corresponds to a series of successes and one failure. FIG. 5C shows an example wherein the sub-tree is four levels of success nodes deep and includes only the first failure node. The initial execution data sets prepared for the HW are those for the nodes shown as success nodes 502, 503, 505, and 509, and failure node 504 in solid lined boxes. Initially, the processing system 302 passes to the HW the prepared execution data sets of this first sub-tree. At the completion of a sub-sequence, the HW interrupts the processor with an indication of the outcome. If the outcome is failure, the HW processes the available failure sub-sequence and the processing system 302 rebuilds the new follow-on success sub-sequence queue and the failure sub-sequence execution data set. If the outcome is success, the HW processes the next success sub-sequence and the processor adds the execution data sets for the next not pre-prepared success node, and for the next failure node. Thus there is deep pipelining for the success path but only a one-level deep pipeline for the failure path. Furthermore, the processing system 302 needs to calculate the remainder of the complete sub-tree after a failure, and only has about one sequence execution time for this. Furthermore, there is a pipeline of success paths that will be thrown away when a failure occurs, and only one failure node that will be thrown away when a success occurs.

Another embodiment includes passing to the HW the execution data sets of a sub-tree that corresponds to a series of successes and having one failure node per level. This is illustrated in the example shown in FIG. 5D. Initially the processing system 302 SW passes the transmit hardware 314 a queue of sub-sequence execution data sets corresponding to a series of successes, i.e., nodes 502, 503, 505, and 509, and a queue of sub-sequence execution data sets corresponding to a failure case at each level, i.e., nodes 504, 507, and 511. The HW interrupts the processor at completion of a sub-sequence with an indication of the outcome. If the outcome is failure then the HW processes the already available failure sub-sequence and the processing system 302 rebuilds the sub-sequence queues. If the status is success, the HW processes the next success sub-sequence and the processor again adds to the sub-sequence queues, but this time fewer execution data sets. This embodiment provides deep pipelining for both success and failure paths, with the success path having a deeper pipelining.

Figure 9:
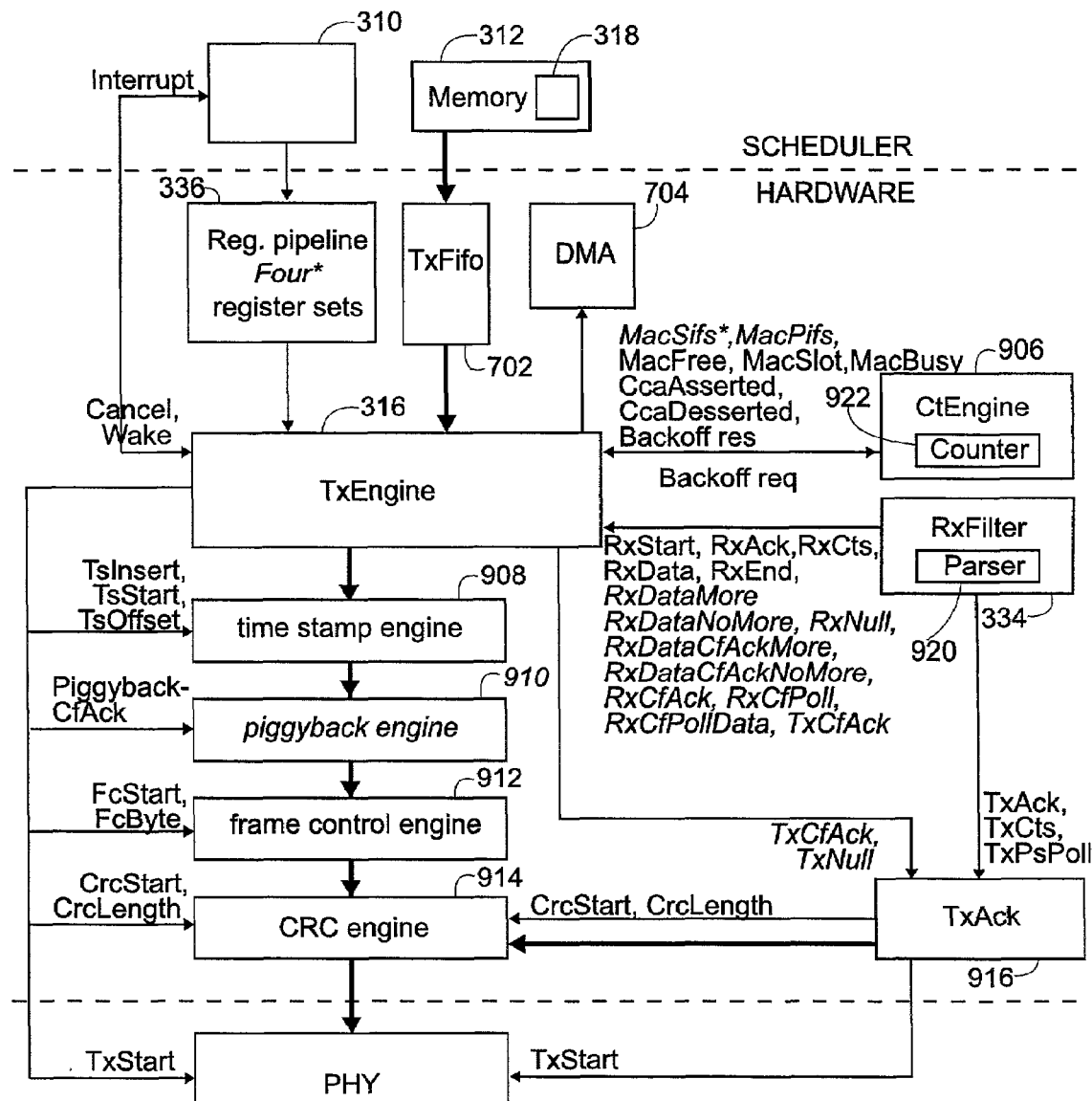
FIG. 9 shows in simplified form a block diagram of a MAC controller according to an embodiment of the invention, including the various engines that make up the transmit hardware part of the MAC controller.

FIG. 9 shows in more detail an embodiment of the MAC processing system that can execute both the PCF and the DCF of the IEEE 802.11 MAC protocol standard. Those elements and signals that are used only for PCF are shown in italics, and an embodiment for implementing only the DCF protocol can leave these out. Those elements and signals that are modified from the DCF version for PCF are shown with an asterisk, e.g., the MacSifs signal and the number of register sets in the register pipeline.

To implement PCF, in one embodiment, three types of outcomes are distinguished, two successes, called "success-more" and "success-nomore," respectively, and a fail outcome. Thus four register sets, the next, fail, success-more, and success-nomore register sets are sent to the TxEngine 316, and there are four register sets in the register set pipeline 336 compared to only three used in a DCF-only embodiment. Note that not all sub-sequences may have the three outcomes; some may have two: success or failure, or one: always success, e.g., a broadcast.

Recall that each sub-sequence to execute can be described by a set of primitives that describe the actions needed for transmission and the processing of any received response. Each primitive describes a simple action in the transmission engine. One or more of the primitives may use the various signals shown in FIG. 9. Some of the primitives and how they may be used to describe some of the possible sub-sequences are described in more detail below.

The RxFilter 334 "filters" received frames and generates signals according to the type of frame received at the station. For simplicity, the receiver part 332 of the MAC controller that includes the RxFilter is not shown. In one embodiment, RxFilter 334 includes a packet parser 920 that parses the received MPDU.

The transmit hardware 314 includes the TxEngine that is connected to a Control Engine ("CtEngine") 906. The TxEngine controls the operation of a time stamp engine 908 to insert or not timestamp data, e.g., in the case of a beacon or probe response, a piggyback engine 910 to include or not piggybacking when used in a subsequence, e.g., piggybacking of an acknowledgment in a MPDU in response of a frame received from the program coordinator (PC) of the network (see the IEEE 802.11 standard, Chapter 9), a frame control engine 912 to add frame control bits when needed, and a CRC engine 914 to add CRC bits.

For some sub-sequences, a MPDU to be transmitted is processed by the TxEngine 316, and then, in turn, when necessary and under control of the TxEngine, processed by one or more of the time stamp engine 908, the piggyback engine 910, the frame control engine 912, and the CRC engine 914 before being passed to the physical layer unit for modulation, coding and transmission.

The CtEngine 906 includes a counter 922 that counts idle slots after a DIFS period of idle as a result of a backoff request ("Backoff req") signal from the TxEngine 316 and produces a response to the TxEngine. The CtEngine also provides MacBusy, MacSifs, MacPifs, MacFree and Mac-Slot signals to the TxEngine that indicate the medium has become busy, the end of a SIFS period, the end of a PIFS period, the end of a DIFS period and the end of an idle slot.

In one embodiment, the RxFilter provides fourteen signals to the TxEngine to indicate whether pre-defined types of packets have been received at the receiver, including nine (point coordination function) specific signals. RxAck is when an Ack MPDU directly addressed to this AP or STA is received. RxCts is when the receiver is an AP in a contention period (CP) or is an STA (normally in a CP), and the MDPU received is a clear to send directly addressed to this AP or STA. RxData is when the receiver is an STA (normally in a CP), and the MDPU received is a Data or Management packet directly addressed to this STA. RxEnd indicates that the MPDU is received. RxStart occurs at the start of reception.

The PCF specific signals include the RxDataMore and RxDataNoMore signal when the receiver is of an AP in a contention-free period (CFP) and receives data with "More Data" or More Fragment" bits set (RxDataMore) or clear (RxDataNoMore) and directly addressed to the AP.

Other PCF signals include RxNull, RxDataCfAckMore, RxDataCfAckNoMore, and RxCfAck. RxNull indicates when the receiver is of an AP in a CFP and the MPDU received is a Null directly addressed to this AP. RxDataCfAckMore and RxDataCfAckNoMore indicate when the receiver is of an AP in a CFP and the received MPDU is a Data+CfAck MPDU with the "More Data" or "More Fragment" bits set (RxDataCfAckMore) or clear (RxDataCfAckNoMore) and directly addressed to the AP. RxCfAck is a signal that occurs in the case that the receiver is of an AP when the AP is in a CFP and the MPDU received is a CfAck directly addressed to this AP, and in the case that the receiver is a Cf-pollable STA (normally only in a CPF), and the MPDU received is a CfAck directly addressed to this AP, or the MPDU received is a CfPoll+CfAck, CfPoll+Data+CfAck or Data+CfAck directly addressed to any STA that is from this STA's AP, or the MPDU received is a CfEnd+CfAck addressed to a broadcast address, but from this STA's AP.

The PCF specific signals from RxFilter further include RxCfPoll, RxCfPollData, and TxCfAck. RxCfPoll is indicated when the receiver is a CF-pollable STA (normally only in a CFP) and the MPDU received is a CfPoll or a CfPoll+CfAck directly addressed to this STA from this STA's AP. RxCfPollData is indicated when the receiver is a CF-pollable STA (normally only in a CFP) and the MPDU received is a CfPoll+Data or a CfPoll+Data+CfAck directly addressed to this STA from this STA's AP. TxCfAck occurs when the receiver is an AP in CFP and the MPDU received is a Data or Data+CfAck directly addressed to this AP.

Also included is an acknowledgment engine (TxAck) 916 to form an acknowledgment frame, e.g., an Ack, or a CTS. either under control of the TxEngine or in response to a signal from the RxFilter 334 generated when the RxFilter 916 detects that a frame requiring transmitting an acknowledgment frame is received by the receiver 334. The acknowledgment engine 916 is coupled and passes the acknowledgment frame to the CRC engine.

Thus, in one embodiment, the TxAck engine 916 frees the TxEngine from producing different types of acknowledgment signals as a result of the receiver receiving specific types of MPDUs. In alternate embodiments, one or more functions of the TxAck module are performed directly by the TxEngine.

In one embodiment, the signals that are sent from the RxFilter 334 to the TxAck module 916 include TxAck, TxCts, and TxPsPoll. TxAck is a signal from the RxFilter that causes the TxAck module 916 to prepare for transmission and transmit one of several types of acknowledgment MPDUs. TxAck occurs as follows. If the receiver is disabled, TxAck is issued when the MPDU received is a ProbeRes directly addressed to this disabled receiver. If the receiver is AP in CP, TxAck occurs when the MPDU received is a Data type directly addressed to this AP. Normally this is only a Data or Null. TxAck also occurs when the MPDU received is a Management type directly addressed to the AP. Normally this is only an AsocReq, ReasocReq, Disasoc, Auth, Deauth, or ProbeReq.

If the receiver is an STA, the TxAck is slightly different in PCF than in DCF. In DCF, and normally only in a CP, TxAck occurs when the received MPDU is a Data type directly addressed to this STA. This is normally only a Data or Null. TxAck also occurs when the received MPDU is a Management type directly addressed to this STA. This is normally only an AsocRes, ReasocRes, Disasoc, Auth, Deauth, or ProbeRes.

For PCF, if the receiver is a CF-pollable STA, TxAck occurs when the received MPDU is Data or Data+CfAck directly addressed to this STA, normally only in CFP. TxAck also occurs when the received MPDU is Data or Null directly addressed to this STA, normally only in CP, and when the received MPDU is a Management type directly addressed to the STA. The Management types are normally only AsocRes, ReasocRes, Disasoc, Auth, Deauth or ProbeRes.

For PCF, if the receiver is a non CF-pollable STA, TxAck occurs when the received MPDU is a Data type directly addressed to this STA. Normally this is a CfPoll, CfPoll+CfAck, CfPoll+Data+CfAck, CfPoll+Data, Data (in CFP), or a Data or Null (in CP). TxAck also occurs when the received MPDU is a Management type directly addressed to this STA. This is normally only an AsocRes, ReasocRes, Disasoc, Auth, Deauth, or ProbeRes.

TxCts is a signal that occurs when the receiver is an AP in a CP or an STA that is normally only in a CP, and when the received MPDU is an RTS directly addressed to this AP or STA, and NAV allows a CTS to be sent.

RxPsPoll is a signal that occurs when the receiver is an AP in CP, and the received MPDU is a PsPoll directly addressed to this AP.

The DCF Primitives.

In one embodiment, the following primitives are used to describe the actions needed for executing each of the subsequences of Table 1:

An access primitive ("Access") that causes the transmit hardware to attempt immediate access and then undertakes any necessary backoff. Access has $CW_{curr}$, denoting the current contention window (CW) as a parameter. Referring to FIG. 9, the TxEngine 316 performs an Access by checking if a backoff is not already in progress, and if so starting a backoff using $CW_{curr}$ using the Backoff req signal to request backoff from the CtEngine 906 then waits to receive a Backoff result signal from the CtEngine.

A backoff primitive ("Backoff") that causes the transmit hardware to undertake backoff without an initial access attempt. Backoff also has $CW_{curr}$ as a parameter.

A wait-for-SIFS primitive ("Wait_SIFS") that causes the transmit hardware to wait for a short interframe space (SIFS). The CtEngine 316 performs Wait_SIFS by waiting for a MacSifs signal from the CtEngine, i.e., waits to just before Rx/Tx turnaround.

A start primitive ("Start") that causes the transmit hardware to instruct the physical layer interface to start transmitting. The PHY has a transmit mode and a receive mode, thus a Start causes an Rx/Tx turnaround and starts transmitting. Referring to FIG. 9, in one embodiment a Start is carried out by issuing a TxStart signal to the PHY.

A CRC primitive ("CRC") that instructs the transmit hardware how to include CRC bits in the data unit of the sub-sequence. The parameters of CRC are CrcStart to indicate after how many bytes the CRC should start, and CrcLength to indicate how many bytes are CRC'd before the CRC information is inserted into the data unit. Referring to FIG. 9, CRC causes the TxEngine 316 to set up the CRC engine 914 with the CrcStart and CrcLength parameters.

A timestamp primitive ("Timestamp") that instructs the transmit hardware whether or not and how to include a timestamp in the data unit of the sub-sequence. The parameters are TsInsert to indicate whether to include a timestamp, TsStart to indicate where to insert the timestamp, and TsOffset, an amount to add to the timestamp to adjust for rate and for PHY delay. Referring to FIG. 9, Timestamp causes the TxEngine 316 to set up the timestamp engine 908 to insert or not the timestamp, and if to insert, sets up the time stamp engine to insert a 64-bit timestamp+TsOffset in the MPDU after TsStart bytes.

A frame control primitive ("FrameControl") that causes the transmit hardware to set up the frame control field of the data unit of the sub-sequence. The parameters are FcStart to indicate the location (as a byte number) in the second byte of the frame control field, and FcByte, the value of the second frame-control field byte. Referring to FIG. 9, FrameControl causes the TxEngine 316 to set up the frame control engine 912 to insert the value FcByte in byte number FcStart.

A chunk primitive ("Chunk") that causes the transmit hardware to include a chunk of a physical layer convergence protocol data unit (PPDU) for transmission in the data unit of the sub-sequence. The parameters are PowerBytes that provide the power bytes for the PHY, ChunkPointer that points to a buffer structure containing a chunk of the PPDU, and ChunkLength that specifies the length of the buffer structure containing the chunk of the PPDU. Chunk causes the TxEngine 316 to program the DMA controller 704 to transfer the chunk to the data FIFO.

A wait for Ack primitive ("Wait_for_ACK") that causes the transmit hardware to wait for an acknowledgement. The parameters are WaitCcaStart, the time by which the clear channel assessment (CCA) must assert from the end of transmission, WaitCcaStop, the time at which the CCA must remain asserted from the end of transmission, WaitRxStart, the time by which RxStart indication must be completed from the end of transmission and CWfail, the contention parameter for the fail case. Referring to the embodiment of FIG. 9, executing a Wait_for_ACK includes the TxEngine 316 waiting for WaitCcaStart, WaitCcaStop from the CtEngine 906 and RsStart and RxEnd from the RxFilter 334. The sub-sequence fails if CcaAsserted fails to be asserted before the WaitCcaStart timer expires. After CcaAsserted is asserted, the TxEngine 316 then waits for a CcaDeasserted signal to be produced by the CtEngine 906. The sub-sequence fails if CcaDeasserted is signalled before the WaitCcaStop timer expires. After this test has passed, the TxEngine 316 then waits for an RxStart signal from the RxFilter 334 to signal the start of receiving an MPDU directed at the wireless station. The sub-sequence fails if RxStart fails to be signalled before the WaitRxStart timer expires. Once the TxEngine 316 receives an RxStart, it waits for an RxEnd signal from the RxFilter 334. If an RxAck signal also is asserted by the RxFilter, the primitive completes, else, the TxEngine 316 starts a backoff in the background using $CW_{fail}$ and exits with "failure" as the outcome of the sub-sequence. $CW_{fail}$ is usually between 0 and 1023.

A wait for CTS primitive ("Wait_for_CTS") that causes the transmit hardware to wait for a Clear to Send ("CTS") response. The semantics of this primitive follow that of the Wait_for_ACK primitive described above, except that when the RxEnd signal is asserted, the TxEngine 316 checks if an RxCts signal rather than an RxAck is asserted by the RxFilter.

A wait for power save poll (PsPoll) primitive ("Wait_for_PsPoll_Ack") that causes the transmit hardware to wait for an acknowledgment to a PsPoll. The acknowledgment may be an Ack or Data(dir). The semantics of this primitive follow that of the Wait_for_ACK primitive described above, except that when the RxEnd signal is asserted, the TxEngine 316 checks if either an RxAck signal or an RxData is asserted by the RxFilter rather than just an RxAck. An RxData signal indicates successful receipt of data by the receiver.

A finished primitive ("Finished") that causes the transmit hardware to initiate a post transmission backoff. Finished has a parameter $CW_{success}$ that is the success case contention window. Finished causes the TxEngine 316 to start a background backoff with the contention window $CW_{success}$ by requesting Backoff from the CtEngine 906. $CW_{success}$ is usually between 0 and 15.

A cancel primitive ("Cancel") that stops a sub-sequence during execution and, in one embodiment, during backoff.

As an example, consider the RTS sub-sequence. An AP or STA in a BSS transmitting an RTS should receive a CTS in reply. In one embodiment, The list of primitives of an RTS sub-sequence is:

---

Access($CW_{curr}$)
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_CTS(WaitCcaStart, WaitCcaStop, WaitRxStart, $CW_{fail}$)
Null( )

---

As another example, consider the Frag sub-sequence. In the following lists of primitives, anything in square brackets [.] is a comment. The Frag primitive list is:

---

Access($CW_{curr}$) or Wait_SIFS [which depends on whether the STA has access

-continued

```
        to the medium from the previous transmission
            of an RTS or fragment]
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_Ack(WaitCcaStart, WaitCcaStop, WaitRxStart, CW_fail)
Finished(CW_success) or Null( ) [Finished is only used when the
    STA wants
        to give up access to the medium after
        successful transmission of the fragment]
```

As another example, consider the Frag(broad) broadcast sub-sequence (the "Broadcast" sub-sequence). The list of primitives of a Broadcast sub-sequence is:

```
Access(CW_curr) or Wait_SIFS [normally Access is used;
Wait_SIFS might be
        used instead in some embodiments when
        sending a broadcast after a beacon in power
        save mode]
Start( )
CRC(CrcStart, CrcLength)
Timestamp(TsInsert=false, TsStart, TsOffset) [only for a
Beacon]
FrameControl(FcStart, FcByte)
Chunk(PowerBytes, ChunkPointer, ChunkLength)
Finished(CW_success) [always successful]
```

The list of primitives of a PsPoll sub-sequence is:

```
Access(CW_curr) or Backoff(CW_curr) [Access is used when
attempting re-
        transmission or after receiving a Traffic
        Indication Map (TIM) with only this STA's bit set;
        Backoff is used when sending after receiving
        a TIM with multiple bits set including this STA]
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_PsPoll_Ack(WaitCcaStart, WaitCcaStop, WaitRxStart,
CW_fail)
Finished(CW_success)
```

Any of the DCF sub-sequence sets shown in Table 1 and described above includes none or one primitive from eight groups of primitives as follows:

1. one primitive from the group consisting of Access, Backoff, and Wait_SIFS primitives,
2. a Start,
3. a CRC,
4. a Timestamp,
5. a FrameControl,
6. a Chunk
7. none (a Null) or one primitive from the group consisting of Wait_for_ACK, Wait_for_CTS, and Wait_for_PsPoll_Ack,
8. none (a Null) or a Finished.

In one embodiment, a register set is encoded with, for each group, whether a primitive of the group is in the list, and, if yes, which parameters are needed.

The PCF Primitives

In one embodiment, the primitives used to describe the actions needed for executing any of the DCF sub-sequences of Table 1 and in addition any of the PCF sub-sequences of Table 2 include the DCF primitives described above, but with the Wait_SIFS primitive having a binary-valued parameter PiggybackAllowed to indicate whether a CfAck is also to be piggybacked, and with a modified Backoff primitive. In the following primitive descriptions, waiting for a timer includes, referring to the embodiment of FIG. 9, the TxEngine 316 setting up the CtEngine 906 to wait for the appropriate signal for the TxEngine 316 when the count is reached. The primitives used for PCF are:

Wait_SIFS( . . . ) waits for SIFS (short interframe space) and optionally programs the piggyback engine. The only parameter is the boolean PiggybackAllowed that indicates whether or not a CfAck may be piggybacked. The semantics are

```
Wait for TxCfAck or MacSifs signal
    if TxCfAck signal received and PiggybackAllowed = false
    then
        send TxCfAck signal to TxAck engine
        program PiggybackEngine to not piggyback CfAck
        wait for MacSifs signal twice
    else if TxCfAck signal received and PiggybackAllowed =
    true then
        program PiggybackEngine to piggyback CfAck
        wait for MacSifs signal
    else if MacSifs signal received then
        program PiggybackEngine to not piggyback CfAck
```

Note that two MacSifs are required when the TxAck engine transmits a CfAck.

Wait_PIFS( ) waits for PIFS (point coordination function interframe space). There are no parameters. The semantics are:

```
Wait for MacPifs or TxCfAck signals
    if TxCfAck signal received then
        send TxCfAck signal to TxAck engine
        wait for MacPifs
    else if MacPifs signal received then
        continue
```

Backoff( . . . ) undertakes backoff without an initial access attempt. The only parameter is $CW_{curr}$, the contention window. The semantics are:

```
If backoff not already in progress then
    start backoff using CW_curr,
Wait for Backoff Response signal or TxCfAck signal
    if TxCfAck signal received then
        Send TxCfAck signal to TxAck engine
        Wait for Backoff Response signal
    else if Backoff Response signal received then
        continue
```

Wait_Beacon_CFP_Access( . . . ) waits for a beacon access opportunity at start of CFP. The only parameter is $CW_{curr}$, the CW. The semantics are:

```
Set PifsPeriod timer
Wait for PifsPeriod timer
```

-continued
```
    if PifsPeriod expires or MacBusy received then
        start backoff using CW_curr
            wait until complete
    else if MacPifs, MacFree or MacSlot received then
        continue
```

Wait_for_CfPoll( ) waits for a CfPoll from an AP (access point) addressed to this STA (station), and has no parameters. The semantics are:

```
Wait for RxCfPoll signal or RxCfPollData signal
    If receive RxCfPoll signal then
        Program PiggybackEngine to not piggyback CfAck
    else if receive RxCfPollData signal
        Program PiggybackEngine to piggyback CfAck
Wait for MacSifs signal
```

Wait_for_CfPoll_Ack( . . . ) waits for an acknowledgment to a CfPoll{+CfAck} sub-sequence. The parameters are WaitCcaStart, WaitCcaStop, WaitRxStart, as defined above (see Wait_for_ACK). Note that executing a CfPoll{+CfAck} sub-sequence can result in two types of successes. The semantics are

```
Set WaitCcaStart, WaitCcaStop, WaitRxStart timers
Wait for CcaAsserted signal or WaitCcaStart timer
    if CcaAsserted signal received then
        continue
    else if WaitCcaStart timer expires then
        exit(Fail)
Wait for CcaDeasserted signal or WaitCcaStop timer
    if CcaDeasserted signal received then
        exit(Fail)
    else if WaitCcaStop timer expires then
        continue
Wait for RxStart signal or WaitRxStart timer
    if RxStart signal received then
        continue
    else if WaitRxStart timer expires then
        exit(Fail)
Wait for RxEnd signal
    if RxDataNoMore signal received then
        exit(Success_More)
    else if RxDataNoMore signal received then
        exit(Success_NoMore)
    else if RxNull received then
        exit(Success_NoMore)
    else if RxAck received then
        exit(Success_NoMore)
    else
        exit (Fail)
```

Wait_for_CfPollData_Ack( . . . ) waits for an acknowledgment to a CfPoll+Data(dir){+CfAck} sub-sequence. The parameters are WaitCcaStart, WaitCcaStop, WaitRxStart. There are three possible outcomes to a CfPoll+Data(dir){+CfAck} sub-sequence. The semantics are:

```
Set WaitCcaStart, WaitCcaStop, WaitRxStart timers
Wait for CcaAsserted signal or WaitCcaStart timer
    if WaitCcaStart timer expires then
        exit(Fail)
    else if CcaAsserted signal received then
        continue
Wait for CcaDeasserted signal or WaitCcaStop timer
    if CcaDeasserted signal received then
        exit(Fail)
    else if WaitCcaStop timer expires then
        continue
Wait for RxStart signal or WaitRxStart timer
    if WaitRxStart timer expires then
        exit(Fail)
    else if RxStart signal received then
        continue
Wait for RxEnd signal
    if RxDataCfAckMore signal received then
        exit(Success_More)
    else if RxDataCfAckNoMore signal received then
        exit(Success_NoMore)
    else if RxCfAck received then
        exit(Success_NoMore)
    else if RxAck received then
        exit(Success_NoMore)
    else
        exit (Fail)
```

Wait_for_Data_Ack( . . . ) waits for an acknowledgment to a Data(dir) {+CfAck} from an STA. The parameters are WaitCcaStart, WaitCcaStop, WaitRxStart. The semantics are:

```
Set WaitCcaStart, WaitCcaStop, WaitRxStart timers
Wait for CcaAsserted signal or WaitCcaStart timer
    if WaitCcaStart timer expires then
        exit(Fail)
    else if CcaAsserted signal received then
        continue
Wait for CcaDeasserted signal or WaitCcaStop timer
    if CcaIaDeasserted signal received then
        exit(Fail)
    else if WaitCcaStop timer expires then
        continue
Wait for RxStart signal or WaitRxStart timer
    if WaitRxStart timer expires then
        exit(Fail)
    else if RxStart signal received then
        continue
Wait for RxEnd signal
    if RxCfAck received then
        exit(Success)
    else
        exit(Fail)
```

In one embodiment, each of the PCF sub-sequences of Table 2 has the following structure of eight primitive groups:
1. One of an Access, a Wait_SIFS, a Wait_PIFS, a Backoff, a Wait_Beacon_CFP_Access, or a Wait_Cf-Poll.
2. A Start.
3. A CRC.
4. A Timestamp.
5. A FrameControl.
6. A Chunk.
7. One of a Wait_for_PsPoll_Ack, a Wait_for_CfPoll_Ack, a Wait_for_CfPollData_Ack, a Wait_for_ACK, Wait_for_CfAck, a Wait_for_CTS, or a Null
8. a Finished or a null For example, the CfPoll{+CfAck} sub-sequence primitive list is:

```
Wait_SIFS(PiggybackAllowed) or Wait_PIFS( ) or Backoff(CW_curr)
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_CfPoll_Ack(WaitCcaStart, WaitCcaStop, WaitRxStart)
Null( )
```

The CfPoll+Data(dir){+CfAck} sub-sequence primitive list is

```
Wait_SIFS(PiggybackAllowed) or Wait_PIFS( ) or Backoff(CW_curr)
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_CfPollData_Ack (WaitCcaStart, WaitCcaStop, WaitRxStart)
Null( ).
```

The Data(dir){+CfAck} sub-sequence primitive list for an AP is:

```
Wait_SIFS(PiggybackAllowed) or Wait_PIFS( ) or Backoff(CW_curr)
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_Ack (WaitCcaStart, WaitCcaStop, WaitRxStart, . . .) [with the CW parameter in the Wait_for Ack( . . . ) primitive a don't care]
Null( ).
```

The Mgt(dir) sub-sequence primitive list is:

```
Wait_SIFS(PiggybackAllowed=false) or Wait_PIFS( ) or Backoff(CW_curr)
Start( )
CRC(CrcStart, CrcLength)
Timestamp(TsInsert, TsStart, TsOffset)
FrameControl(FcStart, FcByte)
Chunk(PowerBytes, ChunkPointer, ChunkLength)
Wait_for_Ack (WaitCcaStart, WaitCcaStop, WaitRxStart, . . . ) [with the CW parameter in the Wait_for_Ack( . . . ) primitive a don't care]
Null( ).
```

The Data(dir){+CfAck} sub-sequence primitive list for an STA is:

```
Wait_for_CfPoll( )
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Wait_for_Data_Ack(WaitCcaStart, WaitCcaStop, WaitRxStart)
Null( )
```

The Data(broadcast) and Mgt(broadcast) sub-sequence primitive lists, not for a beacon, are:

```
Wait_SIFS(PiggybackAllowed=false) or WaitPIFS( ) or Backoff(CW_curr)
Start( )
CRC(CrcStart, CrcLength)
Timestamp(TsInsert=false, TsStart, TsOffset)
FrameControl(FcStart, FcByte)
Chunk(PowerBytes, ChunkPointer, ChunkLength)
Null( ).
```

The Beacon(broadcast) sub-sequence primitive list is:

```
Wait_SIFS(PiggybackAllowed=false) or Wait_PIFS( ) or Backoff(CW_curr) or
Wait_Beacon_CFP Access(CW_curr)
Start( )
CRC(CrcStart, CrcLength)
Timestamp(TsInsert=true, TsStart, TsOffset)
FrameControl(FcStart, FcByte)
Chunk(PowerBytes, ChunkPointer, ChunkLength)
Null( ).
```

One aspect of the invention is the flexibility of the design. New sub-sequences can be defined for different policies. Furthermore, in the embodiments described above, the time-critical function of transmitting MPDUs and checking if a response was correctly received in the allowed time are carried out in hardware.

Thus have been described various embodiments of the invention.

Note that while the particular embodiment implements the packet scheduler with a processing system that includes a processor and a memory that contains programming instructions for the processor to perform the functions described herein, e.g., preparing and loading the execution data sets, an alternate embodiment has a dedicated hardware packet scheduler that includes a scheduling engine and a memory, wherein such basic functions as preparing and loading an execution data set are hard wired. Such a packet scheduler in one embodiment further includes a processor for implementing programmable aspects. Thus, the term packet scheduler is used herein to mean either the processing system, or a packet scheduler that includes dedicated hardware and, in some embodiments, a processor.

Furthermore, those in the art will recognize that the transmit hardware may also be implemented using a processor, so long as the implementation is sufficiently fast to ensure that the time-critical tasks can be successfully carried out. This might require a fast and expensive processor.

Note that while in one embodiment a particular set of primitives is used to implement DCF and another is used for PCF, in alternate embodiments the PCF and DCF sub-sequences can each be decomposed into different sets of primitives than the ones described herein. Furthermore, other types of sub-sequences for other protocols and policies thereof may be constructed, and the invention is not limited to any set of primitives or policies or protocols.

Note that while an interrupt process is described for indicating to the processing system 302 that the transmission of the sub-sequence by the hardware led to success or failure, other mechanisms to indicate the result of the transmission to the processing system 302 may be used in alternate embodiments.

Furthermore, one embodiment included in the register set passed to the HW a pointer to any data in memory that is to be transmitted. The transmission of the data is into a FIFO buffer (TxFifo) and occurs under DMA. In alternate embodiments, the register set itself may include the data. In other alternate embodiments, mechanisms other than DMA are used to transfer to-be-transmitted data from the memory to the HW.

Furthermore the time stamp, piggyback, frame control and CRC engines are shown connected in series so that the time stamp, piggyback, frame control, and CRC data are added sequentially as the data unit passes from one of these engines to the next. Alternate embodiments may include some or all of these engines in a different configuration, for example in a parallel configuration.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A MAC controller for a wireless station of a wireless network to operate according to one or more transmission policies of a MAC protocol, a transmission according to a policy decomposable into a set of sequential sub-sequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more sub-sequences, such that a transmission from any point in time according to a policy is representable by a tree, each node of the tree representing a sub-sequence, and each branch from a particular node of the tree representing one of the outcomes of the subsequence of the particular node, the MAC controller comprising:

a packet scheduler coupled to a data link layer interface and including a scheduling engine and a memory, and transmit hardware coupled to a physical layer interface, the transmit hardware to execute a sub-sequence and to cause transmission of the data unit of the sub-sequence and to detect which outcome occurs, executing a sub-sequence being describable to the transmit hardware by a corresponding set of execution data, the hardware further including a buffer coupled to the packet scheduler, the buffer organized to receive from the scheduler and store sets of execution data, the hardware further including a signal path to the scheduling engine to provide an indication to the packet scheduler of the outcome of executing a sub-sequence;

wherein the transmit hardware is coupled to a receiver coupled to the physical layer interface to indicate to the transmit hardware the reception at the wireless station of a data unit of one of a set of received data unit types that includes those that may be in response to a transmission of a sub-sequence, wherein the packet scheduler is arranged to initially prepare and load into the buffer the execution data set for executing all the sub-sequences of a sub-tree starting from the first sub-sequence of the tree;

wherein the buffer is organized as a pipeline for execution data sets; and wherein after a number of sub-sequences are executed, the packet scheduler, in response to an indication received from the transmit hardware of a particular outcome of a particular sub-sequence, is to provide and load into the buffer the execution data sets needed so that while the hardware is executing the sub-sequence resulting from the particular outcome, the buffer contains the execution data sets of at least each sub-sequence that follows the sub-sequence resulting from the particular outcome, such that the time available for the packet scheduler to provide and load the execution data sets in response to the indication is at least the time until the transmit hardware completes executing the sub-sequence following the particular outcome, whereby the sub-sequence being executed and the following subsequences that are available to the transmit hardware during the execution form a sub-tree starting with the node sub-sequence being executed.

2. A MAC controller as recited in claim 1, wherein the packet scheduler includes a processing system including a processor and the memory, the processor to implement the scheduler tasks by executing instructions loadable into the memory, wherein the memory is loadable with code to instruct the processor to prepare and initially load into the buffer an execution data set for the sub-tree starting with the first node of the tree, and wherein the memory is loadable with code to instruct the processing system to provide and load into the buffer, in response to the indication of the particular outcome received at the processing system, all the execution data sets for executing all the sub-sequences that together with the sub-sequence following the particular outcome, form the sub-tree starting with the sub-sequence following the particular outcome.

3. A MAC controller as recited in claim 2, wherein the sub-tree includes levels for each outcome.

4. A MAC controller as recited in claim 2, wherein the indication of the particular outcome uses an interrupt, the transmit hardware further including a DMA controller coupled to the processor memory to control direct memory access from the memory; and a data FIFO coupled to the processor memory to transfer packets of to-be-transmitted data from the processor memory to the transmit hardware under direct memory access, wherein to set up the DMA controller to transfer the appropriate data from memory into the data FIFO depending on the status of previous transmissions such that only data units that are actually transmitted are transferred to the data FIFO.

5. A MAC controller as recited in claim 4, wherein the transmit hardware further includes a transmit engine controller ("TxEngine"), wherein the TxEngine is connected to and accepts data from the pipeline, wherein the TxEngine is further connected to and accepts data from the data FIFO, and is further connected to the DMA controller, wherein the transmit hardware further includes:

a set of processing engines connected to and controlled by the TxEngine to add information to or modify the data unit of a sub-sequence, the set of engines connected to the physical layer interface, and including:

a timestamp engine connected to the TxEngine to include or not timestamp data in the data unit of a sub-sequence;

a frame control engine connected to the TxEngine to include frame control data in the data unit of a sub-sequence;

a CRC engine connected to the TxEngine to include CRC data in the data unit of a sub-sequence;

a counting engine connected to the TxEngine to accept a backoff request from and provide a backoff result to the TxEngine;

a receive filter in the receiver to provide information to the TxEngine controller when one of the set of particular types of packets directed at the wireless station has been received; and an acknowledgment engine coupled to the receive filter and to the CRC engine to form an acknowledgment data unit and pass said acknowledgment data unit to the CRC engine.

6. A MAC controller as recited in claim 1, wherein each sub-sequence is describable by a list of primitives that describe the actions needed for executing the sub-sequence.

7. A MAC controller as recited in claim 1, wherein the MAC protocol is IEEE 802.11 and wherein one of the policies is DCF.

8. A MAC controller as recited in claim 7, wherein the sub-sequences for transmitting according to DCF include sub-sequences from the set consisting of a request to send sub-sequence("RTS"), a packet transmit sub-sequence ("Frag(dir)") to transmit a data or management packet, a data fragment broadcast sub-sequence ("Frag(broad)") for execution in an access point to broadcast a data or management packet, and a power save poll sub-sequence ("PsPoll") for execution in a non-access point station, and wherein each sub-sequence from the DCF sub-sequence set includes a success consequence being success in receiving an expected response, or implicit success when no response is expected, and some sub-sequences each further includes a failure consequence being failure to receive an expected response.

9. A MAC controller as recited in claim 8, wherein each of the sub-sequences is describable by a list of primitives that describe the actions needed for executing the sub-sequence.

10. A MAC controller as recited in claim 9, wherein the primitives are selected from a set of primitives that includes:
a primitive ("Access") that causes the transmit hardware to attempt immediate access and then undertakes any necessary backoff;
a primitive ("Backoff") that causes the transmit hardware to undertake backoff without an initial access attempt;
a primitive ("Wait_SIFS") that causes the transmit hardware to wait for a short interframe space;
a primitive ("Start") that causes the transmit hardware to instruct the physical layer interface that includes a transmit mode and a receive mode to start receive to transmit mode turn around and the start transmitting;
a primitive ("CRC") that instructs the transmit hardware how to include CRC information in the data unit of the sub-sequence;
a primitive ("Timestamp") that instructs the transmit hardware whether or not and how to include a timestamp in the data unit of the sub-sequence;
a primitive ("FrameControl") that causes the transmit hardware to set up a frame control part in the data unit of the sub-sequence;
a primitive ("Chunk") that causes the transmit hardware to include some or all of a physical layer protocol data unit for transmission in the data unit of the sub-sequence;
a primitive ("Wait_for_ACK") that causes the transmit hardware to wait for an Ack acknowledgment response;
a primitive ("Wait_for_CTS") that causes the transmit hardware to wait for a Clear to Send ("CTS") response;
a primitive ("Wait_for_PsPoll_Ack") that causes the transmit hardware to wait for acknowledgment to a PsPoll;
a primitive ("Finished") that causes the transmit hardware to initiate a post transmission backoff; and a primitive ("Cancel") that stops all sub-sequences,
wherein any sub-sequence of the DCF sub-sequences includes:
a primitive from the group consisting of Access, Backoff, and Wait_SIFS,
a Start,
a CRC,
a Timestamp,
a FrameControl, and
a Chunk,
and wherein any sub-sequence of the DCF sub-sequences may include none, one or both of:
a primitive from the group consisting of Wait_for_ACK, Wait_for_CTS, and Wait_for_PsPoll_Ack, and
a Finished.

11. A MAC controller as recited in claim 7, wherein one of the policies is PCF.

12. A MAC controller as recited in claim 8, wherein one of the policies is PCF and wherein the sub-sequences for transmitting according to PCF include sub-sequences from the set consisting of:
a contention-free poll sub-sequence ("CfPoll") that may include a piggybacked contention free acknowledgment ("CfAck"), the CfPoll sub-sequence being for execution in an access point;
a contention-free poll with data sub-sequence ("CfPoll-Data"), that may include a piggybacked contention free acknowledgment ("CfAck"), the CfPollData being a CfPoll that further includes a data fragment and being for execution in an access point;
a data packet transmit sub-sequence ("Data(dir)") that may include a piggybacked CfAck;
a management packet sub-sequence ("Mgt(dir)") for execution in an access point;
a data packet broadcast sub-sequence ("Data(broad)") for execution in an access point; and
a management packet broadcast sub-sequence ("Mgt (broad)") for execution in an access point,
and wherein each sub-sequence from the PCF sub-sequence set includes a first success outcome being either success in receiving one of a first set of expected responses or implicit success when no response is expected, wherein some sequences for execution in an access point further include a second success outcome being success in receiving one of a first set of expected responses from a non-access point station, and further receiving an indication that the non-access point station has more data, and wherein some sub-sequences each further include a failure consequence being failure to receive an expected response.

13. A MAC controller as recited in claim 12, wherein each of the sub-sequences is describable by a list of primitives that describe the actions needed for executing the sub-sequence.

14. A MAC controller as recited in claim 13, wherein the set of primitives for each of the DCF sub-sequences includes:
a primitive ("Access") that causes the transmit hardware to attempt immediate access and then undertakes any necessary backoff;
a primitive ("Backoff") that causes the transmit hardware to undertake backoff without an initial access attempt;
a primitive ("Wait_SIFS") that causes the transmit hardware to wait for a short interframe space;
a primitive ("Start") that causes the transmit hardware to instruct the physical layer interface that includes a transmit mode and a receive mode to start receive to transmit mode turn around and the start transmitting;

a primitive ("CRC") that instructs the transmit hardware how to include CRC information in the data unit of the sub-sequence;
a primitive ("Timestamp") that instructs the transmit hardware whether or not and how to include a timestamp in the data unit of the sub-sequence;
a primitive ("FrameControl") that causes the transmit hardware to set up a frame control part in the data unit of the sub-sequence;
a primitive ("Chunk") that causes the transmit hardware to include some or all of a physical layer protocol data unit for transmission in the data unit of the sub-sequence;
a primitive ("Wait_for_ACK") that causes the transmit hardware to wait for an acknowledgment ("Ack") response;
a primitive ("Wait_for_CTS") that causes the transmit hardware to wait for a Clear to Send ("CTS") response;
a primitive ("Wait_for_PsPoll_Ack") that causes the transmit hardware to wait for acknowledgment to a PsPoll;
a primitive ("Finished") that causes the transmit hardware to initiate a post transmission backoff; and
a primitive ("Cancel") that stops all sub-sequences,
wherein any sub-sequence of the DCF sub-sequence set includes:
a primitive from the group consisting of Access, Backoff, and Wait_SIFS,
a Start,
a CRC,
a Timestamp,
a FrameControl, and
a Chunk,
wherein any DCF sub-sequence further includes none, one or both of
a primitive from the group consisting of Wait_for_ACK, Wait_for_CTS, and Wait_for_PsPoll_Ack, and
a Finished,
wherein the set of primitives for each of the PCF subsequences includes none or more of the primitives for the DCF sub-sequence set,
wherein the Wait_SIFS primitive optionally causes the transmit hardware to piggyback a CfAck,
wherein the Backoff primitive optionally causes the transmit hardware to send a CfAck,
wherein the set of primitives for the PCF subsequence set further includes:
a primitive ("Wait_PIFS") that causes the transmit hardware to wait for a point coordination function interframe space;
a primitive ("Wait_for_CfPoll") that causes the transmit hardware of a non-access point station to wait for a CfPoll from an access point addressed to said non-access point station;
a primitive ("Wait_for_CfPoll_Ack") that causes the transmit hardware of an access point to wait for an acknowledgment after transmitting a CfPoll;
a primitive ("Wait_for_CfPollData_Ack") that causes the transmit hardware of an access point to wait for an acknowledgment after transmitting a CfPoll with data;
a primitive ("Wait_for_Data_Ack") that causes the transmit hardware of an access point to wait for an acknowledgment from a non-access point station after transmitting a Data(dir); and
a primitive ("Wait_Beacon_CFP_Access") that causes the transmit hardware to wait for a beacon access opportunity at the start of a contention-free period,
wherein any sub-sequence of the PCF sub-sequence set includes:
a primitive from the group consisting of Access, Wait_SIFS, Wait_PIFS, Backoff, Wait_Beacon_CFP_Access, and Wait_CfPoll,
a Start,
a CRC,
a Timestamp,
a FrameControl, and
a Chunk,
and wherein any PCF sub-sequence further includes none, one or both of
a primitive from the group consisting of Wait_for_PsPoll_Ack, Wait_for_CfPoll_Ack, Wait_for_CfPoll-Data_Ack, Wait_forACK, Wait_for_CfAck, and Wait_for_CTS, and
a Finished.

15. A MAC controller as recited in claim 14, wherein the packet scheduler includes a processing system including a processor and the memory, the processor to implement the scheduler tasks by executing instructions loadable into the memory,
wherein the indication of the particular outcome uses an interrupt, the transmit hardware further including
a DMA controller coupled to the processor memory to control direct memory access therefrom; and
a data FIFO coupled to the processor memory to transfer packets of to-be-transmitted data from the processor memory to the transmit hardware under direct memory access, and
wherein the transmit hardware is arranged to set up the DMA controller to transfer the appropriate data from memory into the data FIFO depending on the status of previous transmissions such that only data units that are actually transmitted are transferred to the data FIFO.

16. A MAC controller as recited in claim 15, wherein the transmit hardware further includes:
a transmit engine controller ("TxEngine") connected to and accepting data from the pipeline, the TxEngine further connected to and accepting data from the data FIFO, and further connected to the DMA controller,
a set of processing engines connected to and controlled by the TxEngine to add information to or modify the data unit of a sub-sequence, the set of engines connected to the physical layer interface, and including:
a timestamp engine connected to the TxEngine controller to include or not timestamp data in the data unit of a sub-sequence;
a frame control engine connected to the TxEngine controller to include frame control data in the data unit of a sub-sequence;
a CRC engine connected to the TxEngine controller to include CRC data in the data unit of a sub-sequence;
a counting engine connected to the TxEngine controller to accept a backoff request from and provide a backoff result to the TxEngine controller;
a receive filter in the receiver to provide information to the TxEngine controller when one of a set of particular types of packets directed at the wireless station has been received; and
an acknowledgment engine coupled to the receive filter and to the CRC engine to form an acknowledgment data unit and pass said acknowledgment data unit to the CRC engine.

17. A MAC controller for a wireless station of a wireless network to operate according to one or more transmission policies of a MAC protocol, a transmission according to a policy decomposable into a set of sequential sub-sequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more sub-sequences, the MAC controller comprising:

transmit hardware coupled to a physical layer interface, the transmit hardware capable of executing a sub-sequence by causing transmission of the data unit of the sub-sequence and detecting which outcome occurs, a packet scheduler coupled to a data link layer interface and configured to prepare a set of execution data that describes to the transmit hardware how to execute a sub-sequence, the packet scheduler including a memory, wherein the transmit hardware includes a buffer coupled to the packet scheduler to receive a set of execution data, and a signal path to the packet scheduler to provide an indication to the packet scheduler of the outcome of executing a sub-sequence, wherein the transmit hardware is coupled to a receiver coupled to the physical layer interface to indicate to the transmit hardware the reception at the wireless station of a data unit of one of a set of received data unit types that includes those that may be in response to a transmission of a sub-sequence, wherein executing a sub-sequence is describable to the transmit hardware by a corresponding set of execution data, wherein the packet scheduler is configured to prepare and pass to the transmit hardware via the buffer the execution data sets for executing one or more sub-sequences in response to an indication from the transmit hardware of the outcome of a sub-sequence execution.

18. A MAC controller as recited in claim 17, wherein the packet scheduler includes a processing system including a processor and the memory, the processor to implement the scheduler tasks by executing instructions loadable into the memory, wherein the memory is loadable with code to instruct the processor to prepare and pass to the transmit hardware via the buffer the execution data sets of the one or more sub-sequences.

19. A MAC controller as recited in claim 17, wherein the buffer is organized as a pipeline for execution data sets, wherein a transmission from any point in time according to a policy is representable by a tree, each node of the tree representing a sub-sequence, and each branch from a particular node of the tree representing one of the outcomes of the sub-sequence of the particular node, and wherein after a number of levels of the tree have been executed, the one or more data sets prepared and passed in response to the indication are such that when the transmit hardware is executing a particular sub-sequence, the transmit hardware already has available the execution data sets of at least one sub-sequence that follows the particular sub-sequence, whereby the particular sub-sequence being executed and the following sub-sequences that are available to the transmit hardware during the execution form a sub-tree starting with the node of the particular sub-sequence.

20. A MAC controller as recited in claim 19, wherein the sub-tree has two levels and the execution data set of every outcome sub-sequence of the particular sub-sequence is available to the hardware during the execution of the particular sub-sequence.

21. A MAC controller as recited in claim 19, wherein the sub-tree has at least two levels for each outcome of the particular sub-sequence being executed.

22. A MAC controller as recited in claim 19, wherein the sub-tree is a pruned sub-tree that has more levels for the most likely path of sub-sequences of the tree.

23. In a wireless station of a wireless data network, a method of transmitting packets of information according to a MAC transmission policy, the transmission of the packets according to the policy decomposable into a set of sequential sub-sequences, executing each sub-sequence including transmitting a data unit and in the case that the data unit transmission has a set of one or more expected responses, successfully receiving or not one of the expected responses at the wireless station, each subsequence having a finite set of outcomes, each of the outcomes leading to further executing of none or more sub-sequences, the method comprising (a) determining the next sub-sequence, (b) passing to a buffer of a transmit engine included in the wireless station a set of execution data for the next sub-sequence describing how to execute the next sub-sequence;

(c) determining for each outcome of the next sub-sequence, at least one of the sub-sequences following the outcome;

(d) passing to the buffer the execution data sets of at least the sub-sequences following each outcome of the next sub-sequence;

(e) waiting for an indication from the transmit engine of the outcome of executing the next sub-sequence, the outcome defining a new next sub-sequence as the corresponding determined sub-sequence following the outcome if the outcome has a following sub-sequence;

(f) in the case that the outcome has a following sub-sequence, continuing by repeating the steps starting with said step (c) of determining for each outcome of the new next sub-sequence, the sub-sequence following the outcome, and in the case that the outcome does not have a following sub-sequence, continuing by repeating the steps starting with said step (a) of determining for a new next sub-sequence, the method further comprising repeating in the transmit engine until no more execution data is available the steps of accepting the execution data set of the next sub-sequence from the buffer;

executing the next sub-sequence; and after one of the outcomes of the next sub-sequence has occurred, accepting the execution data set of the sub-sequence of the outcome from the buffer and providing the indication of the outcome from the transmit engine.

24. A method as recited in claim 23, wherein the step of determining for each outcome of the next sub-sequence, the sub-sequence following the outcome, and wherein the step of passing to the buffer passes the execution data sets of the sub-sequences following each outcome of the next sub-sequence.

25. A method as recited in claim 23, wherein each sub-sequence is describable by a list of primitives that describe the actions needed for executing the sub-sequence.

26. A method as recited in claim 23, wherein the MAC transmission policy is the DCF of the IEEE 802.11 protocol.

27. A method as recited in claim 26, wherein the MAC transmission policy is the PCF of the IEEE 802.11 protocol.

28. A method as recited in claim 26, wherein the sub-sequences for transmitting according to DCF include sub-sequences from the set consisting of a request to send sub-sequence("RTS"), a packet transmit sub-sequence ("Frag(dir)") to transmit a data or management packet, a data fragment broadcast sub-sequence ("Frag(broad)") for execution in an access point to broadcast a data or management packet, and a power save poll sub-sequence ("PsPoll") for execution in a non-access point station, and wherein each sub-sequence from the DCF sub-sequence set includes a success consequence being success in receiving an expected response, or implicit success when no response is expected, and some sub-sequences each further includes a failure consequence being failure to receive an expected response.

29. A method as recited in claim 28, wherein each of the sub-sequences is describable by a list of primitives that describe the actions needed for executing the sub-sequence.

30. In a wireless station of a wireless data network, a method of transmitting packets of information according to a MAC transmission policy, the transmission of the packets according to the policy decomposable into a set of sequential sub-sequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more sub-sequences, such that following the policy starting from a first sub-sequence is representable by a tree, each node of the tree representing a sub-sequence, and each branch from a particular node of the tree representing one of the outcomes of the sub-sequence of the particular node, the method comprising:
  initially preparing the execution data of the initial sub-sequence and of each sub-sequence of the next level of the tree of the policy;
  passing the sets of execution data for the initial and next tree level sub-sequences to a transmit engine for execution;
  repeating until the tree has been traversed:
    waiting for an indication from the transmit engine of the outcome of completion of execution of a sub-sequence; and
    upon receiving the indication, preparing and passing to the hardware the execution data sets of each sub-sequence of the level of the tree that follows the sub-sequence of the outcome,
  such that a pipeline of execution data for the transmit engine is formed containing two or more levels of the tree.

31. A MAC controller for a wireless station of a wireless network to operate according to one or more transmission policies of a MAC protocol, a transmission according to a policy decomposable into a set of sequential subsequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more sub-sequences, such that a transmission from any point in time according to a policy is representable by a tree, each node of the tree representing a sub-sequence, and each branch from a particular node of the tree representing one of the outcomes of the sub-sequence of the particular node, the MAC controller comprising:
  a packet scheduler coupled to a data link layer interface and including a scheduling engine and a memory, and transmit hardware coupled to a physical layer interface, the transmit hardware to execute a sub-sequence and to cause transmission of the data unit of the subsequence and to detect which outcome occurs, executing a sub-sequence being describable to the transmit hardware by a corresponding set of execution data, the hardware further including a buffer coupled to the packet scheduler, the buffer organized to receive from the scheduler and store a set of execution data, the hardware further including a signal path to the scheduling engine to provide an indication to the packet scheduler of the outcome of executing a sub-sequence;
  wherein the transmit hardware is coupled to a receiver coupled to the physical layer interface to indicate to the transmit hardware the reception at the wireless station of a data unit of one of a set of received data unit types that includes those that may be in response to a transmission of a sub-sequence,
  wherein the packet scheduler is arranged to initially prepare and load into the buffer the execution data set for executing the first sub-sequence of the tree;
  wherein, the packet scheduler, in response to an indication received from the transmit hardware of a particular outcome of a particular sub-sequence, is to provide and load into the buffer the execution data needed for executing one or more sub-sequences that are further along the tree than the particular sub-sequence.

32. A MAC controller for a wireless station of a wireless network to operate according to one or more transmission policies of a MAC protocol, a transmission according to a policy decomposable into a set of sequential sub-sequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more sub-sequences, such that a transmission from any point in time according to a policy is representable by a tree, each node of the tree representing a sub-sequence, and each branch from a particular node of the tree representing one of the outcomes of the sub-sequence of the particular node, the MAC controller comprising:
  means for scheduling packets,
  sub-sequence execution means coupled to a physical layer interface, the sub-sequence execution means for executing a sub-sequence by transmitting the data unit of the sub-sequence and detecting which outcome occurs, executing a sub-sequence being describable by a corresponding set of execution data; and
  buffer means coupled to the packet scheduler for one or more sets of execution data from the scheduling means,
  wherein the execution means is coupled to a receiver coupled to the physical layer interface to indicate to the execution means the reception at the wireless station of a data unit of one of a set of received data unit types that includes those that may be in response to a transmission of a sub-sequence,
  wherein the scheduling means initially prepares and loads into the buffer means the execution data set for executing all the sub-sequences of a sub-tree starting from the first sub-sequence of the tree;
  wherein the execution means provides an indication to the scheduling means of the outcome of executing a sub-sequence,
  wherein after a number of sub-sequences are executed, the scheduling means, in response to an indication received from the execution means of a particular outcome of a particular sub-sequence, provides and loads into the buffer means one or more execution data sets such that while the hardware is executing the sub-sequence resulting from the particular outcome, the buffer contains the execution data sets of at least each sub-sequence that follows the sub-sequence resulting from the particular outcome, such that the time available for the scheduling means to provide and load the execution data sets in response to the indication is at least the time until the execution means completes executing the sub-sequence following the particular outcome, whereby the sub-sequence being executed and the following sub-sequences that are available to the execution means during the execution form a sub-tree starting with the node sub-sequence being executed.

33. A MAC controller as recited in claim 32, wherein the sub-tree has two levels.

34. A MAC controller as recited in claim 32, wherein each sub-sequence is describable by a list of primitives that describe the actions needed for executing the sub-sequence.

35. A MAC controller as recited in claim 32, wherein the MAC transmission policy is the DCF of the IEEE 802.11 protocol.

36. A MAC controller as recited in claim 35, wherein the MAC transmission policy is the PCF of the IEEE 802.11 protocol.

37. A MAC controller as recited in claim 35, wherein the sub-sequences for transmitting according to DCF include sub-sequences from the set consisting of a request to send sub-sequence("RTS"), a packet transmit sub-sequence ("Frag(dir)") to transmit a data or management packet, a data fragment broadcast sub-sequence ("Frag(broad)") for execution in an access point to broadcast a data or management packet, and a power save poll sub-sequence ("PsPoll") for execution in a non-access point station, and wherein each sub-sequence from the DCF sub-sequence set includes a success consequence being success in receiving an expected response, or implicit success when no response is expected, and some sub-sequences each further includes a failure consequence being failure to receive an expected response.

38. A MAC controller as recited in claim 37, wherein each of the sub-sequences is describable by a list of primitives that describe the actions needed for executing the sub-sequence.

39. A carrier medium carrying computer readable code segments to instruct a processor of a processing system of a wireless station of a wireless data network to carry a packet scheduling method for use in a method for transmitting packets of information according to a MAC transmission policy, the transmission of the packets according to the policy decomposable into a set of sequential sub-sequences, executing each sub-sequence including transmitting a data unit and in the case that the data unit transmission has a set of one or more expected responses, successfully receiving or not one of the expected responses at the wireless station, each sub-sequence having a finite set of outcomes, each of the outcomes leading to further executing of none or more subsequences, the carrier medium comprising (a) one or more code segments to instruct the processor to determine the next sub-sequence, (b) one or more code segments to instruct the processor to pass to a buffer of a transmit engine included in the wireless station a set of execution data for the next sub-sequence describing how to execute the next sub-sequence;

(c) one or more code segments to instruct the processor to determine for each outcome of the next sub-sequence, at least one of the sub-sequence following the outcome;

(d) one or more code segments to instruct the processor to pass to the buffer the execution data sets of at least the sub-sequences following each outcome of the next sub-sequence;

(e) one or more code segments to instruct the processor to wait for an indication from the transmit engine of the outcome of executing the next sub-sequence, the outcome defining a new next sub-sequence as the corresponding determined sub-sequence following the outcome if the outcome has a following sub-sequence;

(f) in the case that the outcome has a following sub-sequence, one or more code segments to instruct the processor to continue by repeating the steps starting with said step (c) of determining for each outcome of the new next sub-sequence, the sub-sequence following the outcome, and in the case that the outcome does not have a following sub-sequence, one or more code segments to instruct the processor to continue by repeating the steps starting with said step (a) of determining for a new next sub-sequence, the method for transmitting packets further comprising repeating in the transmit engine until no more execution data is available the steps of accepting the execution data set of the next sub-sequence from the buffer;

executing the next sub-sequence; and after one of the outcomes of the next sub-sequence has occurred, accepting the execution data set of the sub-sequence of the outcome from the buffer and providing the indication of the outcome from the transmit engine.

* * * * *